(12) United States Patent
Li et al.

(10) Patent No.: US 10,728,787 B2
(45) Date of Patent: Jul. 28, 2020

(54) DEVICES AND METHOD FOR MEASUREMENT OF WIRELESS CONDITIONS OF FREQUENCY BANDS

(71) Applicant: Huawei Technologies Co., Ltd., Shenzhen, Guangdong (CN)

(72) Inventors: Qiang Li, Shenzhen (CN); Juan Zheng, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 15/896,339

(22) Filed: Feb. 14, 2018

(65) Prior Publication Data

US 2018/0184317 A1    Jun. 28, 2018

Related U.S. Application Data

(63) Continuation of application No. PCT/CN2015/087049, filed on Aug. 14, 2015.

(51) Int. Cl.
*H04W 24/10* (2009.01)
*H04W 24/08* (2009.01)
(Continued)

(52) U.S. Cl.
CPC .......... *H04W 24/10* (2013.01); *H04W 24/08* (2013.01); *H04W 74/0816* (2013.01); *H04W 16/14* (2013.01)

(58) Field of Classification Search
CPC .................................................. H04W 24/10
See application file for complete search history.

(56) References Cited

U.S. PATENT DOCUMENTS

2009/0196250 A1   8/2009  Feng et al.
2012/0287911 A1  11/2012  Takano et al.
(Continued)

FOREIGN PATENT DOCUMENTS

CN   101262680 A   9/2008
CN   102598773 A   7/2012
(Continued)

OTHER PUBLICATIONS

Machine Translation and Abstract of Chinese Publication No. CN104602267, May 6, 2015, 34 pages.
(Continued)

*Primary Examiner* — Hoon J Chung
(74) *Attorney, Agent, or Firm* — Conley Rose, P.C.

(57) ABSTRACT

Embodiments of the present disclosure relate to a measurement method, user equipment, a network side device, and a measurement apparatus. The method includes: determining, by user equipment, a measurement time set and first measurement configuration information that are corresponding to a first target frequency band, where the first measurement configuration information is configuring the user equipment to perform wireless condition measurement according to identification information of a target cell; determining a status of using the first target frequency band by the target cell corresponding to the identification information; and measuring, in the measurement time set according to the status of using the first target frequency band by the target cell, a wireless condition of the first target frequency band corresponding to the target cell, to obtain a measurement result.

16 Claims, 11 Drawing Sheets

(51) Int. Cl.
*H04W 74/08* (2009.01)
*H04W 16/14* (2009.01)

(56) References Cited

U.S. PATENT DOCUMENTS

| | | | |
|---|---|---|---|
| 2013/0329589 A1 | 12/2013 | Cave et al. | |
| 2015/0215847 A1 | 7/2015 | Yie et al. | |
| 2015/0358827 A1* | 12/2015 | Bendlin | H04W 72/0413 455/454 |
| 2016/0330641 A1 | 11/2016 | Zhang et al. | |

FOREIGN PATENT DOCUMENTS

| | | |
|---|---|---|
| CN | 102648657 A | 8/2012 |
| CN | 103314613 A | 9/2013 |
| CN | 104602267 A | 5/2015 |
| WO | 2012099514 A1 | 7/2012 |
| WO | 2015109516 A1 | 7/2015 |
| WO | 2015111959 A1 | 7/2015 |

OTHER PUBLICATIONS

Foreign Communication From a Counterpart Application, Chinese Application No. 201580071994.9, Chinese Office Action dated Apr. 26, 2019, 9 pages.

Huawei, HiSilicon, "RRM measurement for unlicensed carrier," R1-150981, 3GPP TSG RAN WG1 Ad-hoc Meeting, Paris, France, Mar. 24-26, 2015, 4 pages.

Huawei, HiSilicon, "Further discussion on RRM measurement and DRS design for LAA," R1-152472, 3GPP TSG RAN WG1 81 Meeting, Fukuoka, Japan, May 25-29, 2015, 5 pages.

Qualcomm Incorporated, "Considerations on RRM measurements for LAA-LTE," R2-152708, 3GPP TSG-RAN WG2 Meeting #90bis, Fukuoka, Japan, May, 25-29, 2015, 6 pages.

\* cited by examiner

DEVICES AND METHOD FOR MEASUREMENT OF WIRELESS CONDITIONS OF FREQUENCY BANDS

CROSS-REFERENCE TO RELATED APPLICATIONS

This application is a continuation of International Application No. PCT/CN2015/087049, filed on Aug. 14, 2015, the disclosure of which is hereby incorporated by reference in its entirety.

TECHNICAL FIELD

The present application relates to the mobile communications field, and in particular, to a measurement method, user equipment, a network side device, and a measurement apparatus.

BACKGROUND

Spectrums are a foundation of wireless communication. According to the latest International Spectrum White Paper issued by FCC (Federal Communications Commission), unlicensed frequency band (also referred to as unlicensed spectrum) resources are more than licensed frequency band (licensed spectrum) resources. Therefore, LTE (long term evolution,) user equipment is applied to an unlicensed frequency band. For example, a licensed-assisted access using Long Term Evolution (LAA-LTE) system can not only efficiently utilize the unlicensed frequency band but also provide more efficient wireless access to meet an increasing requirement for mobile broadband services.

To ensure friendly coexistence of systems and devices that perform communication on the unlicensed frequency band, a listen before talk (LBT) channel access mechanism is introduced in some countries and regions, such as Europe and Japan. A basic idea of LBT is as follows: Before sending a signal on a channel, each communications device needs to detect whether the current channel is idle, that is, whether a neighboring node is occupying the channel to send a signal. This detection process is referred to as clear channel assessment (CCA). If it is detected that the channel is idle in a period of time, the communications device can send the signal. If it is detected that the channel is occupied, the communications device currently cannot send the signal.

One unlicensed frequency band generally includes a plurality of carriers. Therefore, an LTE device (such as an LTE eNodeB) may send data simultaneously on a plurality of carriers according to a carrier aggregation capability of the LTE device, that is, may contend, on the plurality of carriers by means of LBT, for an opportunity to use an unlicensed frequency band corresponding to the plurality of carriers. Carriers other than the plurality of carriers on the unlicensed frequency band go beyond the carrier aggregation capability of the LTE eNodeB. Therefore, the LTE eNodeB does not send data on these carriers, that is, may not use these carriers as operating carriers in a period of time. In addition, for user equipment served by the LTE eNodeB, a carrier aggregation capability of the user equipment is usually smaller than the carrier aggregation capability of the LTE eNodeB. Therefore, the user equipment can perform data transmission with the LTE eNodeB only on some carriers in the plurality of carriers. The present disclosure is to resolve a problem about how to design an appropriate measurement mechanism so that the LTE user equipment can accurately distinguish between wireless conditions corresponding to different carriers.

In the prior art, the user equipment separately measures interference energy in an active period and an inactive period of a serving cell. The active period of the serving cell is corresponding to a time period (also referred to as a time resource) in which the serving cell preempts an unlicensed frequency band, and the inactive period of the serving cell is corresponding to a time period in which the serving cell does not preempt an unlicensed frequency band. That is, according to this method, the user equipment can measure interference energy only of the serving cell in different time periods, but cannot learn an active period and an inactive period of another cell (for example, a neighboring cell). Therefore, the user equipment cannot measure interference energy of the another cell in different time periods. This affects obtaining of a comprehensive interference energy measurement result and further affects mobility performance of the user equipment. The mobility performance includes serving cell selection.

SUMMARY

Embodiments of the present disclosure provide a measurement method, user equipment, a network side device, and a measurement apparatus, so that user equipment can measure wireless conditions of different target frequency bands. Therefore, mobility performance of the user equipment can be effectively improved.

According to a first aspect, a measurement method is provided, where the method includes:
 determining, by user equipment, a measurement time set and first measurement configuration information that are corresponding to a first target frequency band, where the first measurement configuration information is configuring the user equipment to perform wireless condition measurement according to identification information of a target cell;
 determining a status of using the first target frequency band by the target cell corresponding to the identification information; and
 measuring, in the measurement time set according to the status of using the first target frequency band by the target cell, a wireless condition of the first target frequency band corresponding to the target cell, to obtain a measurement result.

With reference to the first aspect, in a first implementation of the first aspect, the identification information of the target cell is identification information of a serving cell of the user equipment; and/or
 the identification information of the target cell is determined by the user equipment according to first signaling; and/or
 the identification information of the target cell is determined by the user equipment by means of blind detection.

With reference to the first aspect or the first implementation of the first aspect, in a second implementation of the first aspect, the measuring, according to the status of using the first target frequency band by the target cell, a wireless condition of the first target frequency band corresponding to the target cell includes:
 when it is determined that the status of using the first target frequency band by the target cell is an unused state, measuring, according to a first measurement mode, the wireless condition of the first target frequency band corresponding to the target cell, where the first measurement mode is a mode of measuring energy of the first target frequency band.

With reference to the second implementation of the first aspect, in a third implementation of the first aspect, the determining that the status of using the first target frequency band by the target cell is an unused state includes:
  receiving second signaling, and determining, according to the second signaling, that the status of using the first target frequency band by the target cell in the measurement time set is the unused state.

With reference to the third implementation of the first aspect, in a fourth implementation of the first aspect, the determining that the status of using the first target frequency band by the target cell is an unused state includes:
  detecting a reference signal or reference information on the first target frequency band in the measurement time set, where the reference signal or the reference information carries the identification information of the target cell; and
  if the reference signal or the reference information is not detected, determining that the status of using the first target frequency band by the target cell is the unused state.

With reference to the fourth implementation of the first aspect, in a fifth implementation of the first aspect, the measurement time set includes a first preset time resource; and
  the measuring, according to a first measurement mode, the wireless condition of the first target frequency band corresponding to the target cell includes:
  determining, according to the first measurement mode, a measurement resource corresponding to the first measurement mode, where the measurement resource includes a time resource, and the time resource is in the first preset time resource; and
  measuring, according to the measurement resource corresponding to the first measurement mode, the wireless condition of the first target frequency band corresponding to the target cell.

With reference to the fifth implementation of the first aspect, in a sixth implementation of the first aspect, the first preset time resource includes at least one of the following:
  a time resource that is corresponding to a subframe in which a primary synchronization signal PSS/a secondary synchronization signal SSS included in the reference signal is located; or
  a time resource between a start time of the measurement time set and a moment of the primary synchronization signal PSS/the secondary synchronization signal SSS included in the reference signal.

With reference to the fifth implementation of the first aspect or the sixth implementation of the first aspect, in a seventh implementation of the first aspect, the determining that the status of using the first target frequency band by the target cell is an unused state includes:
  determining that the status of using the first target frequency band by the target cell on the first preset time resource is the unused state.

With reference to the first aspect or the first implementation of the first aspect, in an eighth implementation of the first aspect, the measuring, according to the status of using the first target frequency band by the target cell, a wireless condition of the first target frequency band corresponding to the target cell includes:
  when it is determined that the status of using the first target frequency band by the target cell is a used state, measuring, according to a second measurement mode, the wireless condition of the first target frequency band corresponding to the target cell, where the second measurement mode is a mode of measuring the first target frequency band according to a signal of the target cell.

With reference to the first aspect or the first implementation of the first aspect, in a ninth implementation of the first aspect, the measuring, according to the status of using the first target frequency band by the target cell, a wireless condition of the first target frequency band corresponding to the target cell includes:
  when it is determined that the status of using the first target frequency band by the target cell is a used state, measuring, according to a third measurement mode, the wireless condition of the first target frequency band corresponding to the target cell, where the third measurement mode is a mode of measuring energy of the first target frequency band.

With reference to the eighth implementation of the first aspect or the ninth implementation of the first aspect, in a tenth implementation of the first aspect, the determining that the status of using the first target frequency band by the target cell is a used state includes:
  detecting a reference signal or reference information on the first target frequency band in the measurement time set, where the reference signal or the reference information carries the identification information of the target cell; and
  if the reference signal or the reference information is detected, determining that the status of using the first target frequency band by the target cell is the used state.

With reference to the eighth implementation of the first aspect or the ninth implementation of the first aspect, in an eleventh implementation of the first aspect, the determining that the status of using the first target frequency band by the target cell is a used state includes:
  receiving third signaling, and determining, according to the third signaling, that the status of using the first target frequency band by the target cell in the measurement time set is the used state.

With reference to the tenth implementation of the first aspect, in a twelfth implementation of the first aspect, the measurement time set includes a second preset time resource; and
  the measuring, according to a second measurement mode, the wireless condition of the first target frequency band corresponding to the target cell includes:
  determining, according to the second measurement mode, a measurement resource corresponding to the second measurement mode, where the measurement resource includes a time resource, and the time resource is in the second preset time resource; and
  measuring, according to the measurement resource corresponding to the second measurement mode, the wireless condition of the first target frequency band corresponding to the target cell.

With reference to the twelfth implementation of the first aspect, in a thirteenth implementation of the first aspect, the second preset time resource includes at least one of the following:
  a time resource between a start time and an end time of sending the reference signal or the reference information on the first target frequency band; or a time resource between the start time of sending the reference signal or the reference information on the first target frequency band and an end time of the measurement time set.

With reference to the twelfth implementation of the first aspect or the thirteenth implementation of the first aspect, in a fourteenth implementation of the first aspect, the determining that the status of using the first target frequency band by the target cell is a used state includes:

determining that the status of using the first target frequency band by the target cell on the second preset time resource is the used state.

With reference to the tenth implementation of the first aspect, in a fifteenth implementation of the first aspect, the measurement time set includes a third preset time resource; and the measuring, according to a third measurement mode, the wireless condition of the first target frequency band corresponding to the target cell includes:

determining, according to the third measurement mode, a measurement resource corresponding to the third measurement mode, where the measurement resource includes a time resource, and the time resource is in the third preset time resource; and measuring, according to the measurement resource corresponding to the third measurement mode, the wireless condition of the first target frequency band corresponding to the target cell.

With reference to the fifteenth implementation of the first aspect, in a sixteenth implementation of the first aspect, the third preset time resource includes:

a time resource between a start time of the measurement time set and a start time of sending the reference signal or the reference information on the first target frequency band.

With reference to the fifteenth implementation of the first aspect or the sixteenth implementation of the first aspect, in a seventeenth implementation of the first aspect, the method further includes:

determining that the status of using the first target frequency band by the target cell on the third preset time resource is a dormant state.

With reference to any one of the first aspect or the seventeen implementations of the first aspect, in an eighteenth implementation of the first aspect, the method further includes:

reporting the measurement result when the measurement result meets a preset condition.

With reference to any one of the first aspect or the eighteen implementations of the first aspect, in a nineteenth implementation of the first aspect, the measurement time set is a discovery reference signal timing configuration DMTC.

With reference to any one of the first aspect or the nineteen implementations of the first aspect, in a twentieth implementation of the first aspect, the method further includes:

determining, by the user equipment, second measurement configuration information corresponding to a second target frequency band, where the second measurement configuration information is configuring the user equipment to perform wireless condition measurement not according to the identification information of the target cell; and performing, by the user equipment, wireless condition measurement on the second target frequency band.

According to a second aspect, a measurement method is provided, where the method includes:

sending, by a network side device, a measurement time set and first measurement configuration information that are corresponding to a first target frequency band to user equipment, where the first measurement configuration information is configuring the user equipment to perform wireless condition measurement according to identification information of a target cell, so that the user equipment determines a status of using the first target frequency band by the target cell corresponding to the identification information, and the user equipment measures, in the measurement time set according to the status of using the first target frequency band by the target cell, a wireless condition of the first target frequency band corresponding to the target cell, to obtain a measurement result.

With reference to the second aspect, in a first implementation of the second aspect, the method further includes: receiving the measurement result sent by the user equipment; and performing radio resource management on the user equipment according to the received measurement result.

With reference to the second aspect or the first implementation of the second aspect, in a second implementation of the second aspect, the method further includes:

sending first signaling to the user equipment, where the first signaling is used to indicate that the identification information of the target cell is identification information of a neighboring cell.

With reference to the second aspect, the first implementation of the second aspect, or the second implementation of the second aspect, in a third implementation of the second aspect, the method further includes:

sending second signaling to the user equipment, where the second signaling is used to indicate that the status of using the first target frequency band by the target cell in the measurement time set is an unused state.

With reference to the second aspect or any one of the three implementations of the second aspect, in a fourth implementation of the second aspect, the method further includes:

sending third signaling to the user equipment, where the third signaling is used to indicate that the status of using the first target frequency band by the target cell in the measurement time set is a used state.

With reference to the second aspect or any one of the three implementations of the second aspect, in a fifth implementation of the second aspect, the method further includes:

sending second measurement configuration information corresponding to a second target frequency band to the user equipment, where the second measurement configuration information is configuring the user equipment to perform wireless condition measurement not according to the identification information of the target cell, so that the user equipment performs wireless condition measurement on the second target frequency band.

According to a third aspect, user equipment is provided, where the user equipment includes a determining unit and a measurement unit;

the determining unit is configured to determine a measurement time set and first measurement configuration information that are corresponding to a first target frequency band, where the first measurement configuration information is configuring the user equipment to perform wireless condition measurement according to identification information of a target cell;

the determining unit is further configured to determine a status of using the first target frequency band by the target cell corresponding to the identification information; and the measurement unit is configured to measure, in the measurement time set according to the status that is of using the first target frequency band by the target cell and that is determined by the determining unit, a wireless condition of the first target frequency band corresponding to the target cell, to obtain a measurement result.

With reference to the third aspect, in a first implementation of the third aspect, the identification information of the target cell is identification information of a serving cell of the user equipment; and/or the identification information of the target cell is determined by the user equipment according to first signaling; and/or the identification information of the target cell is determined by the user equipment by means of blind detection.

With reference to the third aspect or the first implementation of the third aspect, in a second implementation of the third aspect, the measurement unit is specifically configured to:

when it is determined that the status of using the first target frequency band by the target cell is an unused state, measure, according to a first measurement mode, the wireless condition of the first target frequency band corresponding to the target cell, where the first measurement mode is a mode of measuring energy of the first target frequency band.

With reference to the second implementation of the third aspect, in a third implementation of the third aspect, the determining that the status of using the first target frequency band by the target cell is an unused state includes:

receiving second signaling, and determining, according to the second signaling, that the status of using the first target frequency band by the target cell in the measurement time set is the unused state.

With reference to the third implementation of the third aspect, in a fourth implementation of the third aspect, the determining that the status of using the first target frequency band by the target cell is an unused state includes:

detecting a reference signal or reference information on the first target frequency band in the measurement time set, where the reference signal or the reference information carries the identification information of the target cell; and if the reference signal or the reference information is not detected, determining that the status of using the first target frequency band by the target cell is the unused state.

With reference to the fourth implementation of the third aspect, in a fifth implementation of the third aspect, the measurement time set includes a first preset time resource; and the measuring, according to a first measurement mode, the wireless condition of the first target frequency band corresponding to the target cell includes:

determining, according to the first measurement mode, a measurement resource corresponding to the first measurement mode, where the measurement resource includes a time resource, and the time resource is in the first preset time resource; and measuring, according to the measurement resource corresponding to the first measurement mode, the wireless condition of the first target frequency band corresponding to the target cell.

With reference to the fifth implementation of the third aspect, in a sixth implementation of the third aspect, the first preset time resource includes at least one of the following:

a time resource that is corresponding to a subframe in which a primary synchronization signal PSS/a secondary synchronization signal SSS included in the reference signal is located; or a time resource between a start time of the measurement time set and a moment of the primary synchronization signal PSS/the secondary synchronization signal SSS included in the reference signal.

With reference to the fifth implementation of the third aspect or the sixth implementation of the third aspect, in a seventh implementation of the third aspect, the determining that the status of using the first target frequency band by the target cell is an unused state includes:

determining that the status of using the first target frequency band by the target cell on the first preset time resource is the unused state.

With reference to the third aspect or the first implementation of the third aspect, in an eighth implementation of the third aspect, the measurement unit is specifically configured to:

when it is determined that the status of using the first target frequency band by the target cell is a used state, measure, according to a second measurement mode, the wireless condition of the first target frequency band corresponding to the target cell, where the second measurement mode is a mode of measuring the first target frequency band according to a signal of the target cell.

With reference to the third aspect or the first implementation of the third aspect, in a ninth implementation of the third aspect, the measurement unit is specifically configured to:

when it is determined that the status of using the first target frequency band by the target cell is a used state, measure, according to a third measurement mode, the wireless condition of the first target frequency band corresponding to the target cell, where the third measurement mode is a mode of measuring energy of the first target frequency band.

With reference to the eighth implementation of the third aspect or the ninth implementation of the third aspect, in a tenth implementation of the third aspect, the determining that the status of using the first target frequency band by the target cell is a used state includes:

detecting a reference signal or reference information on the first target frequency band in the measurement time set, where the reference signal or the reference information carries the identification information of the target cell; and if the reference signal or the reference information is detected, determining that the status of using the first target frequency band by the target cell is the used state.

With reference to the eighth implementation of the third aspect or the ninth implementation of the third aspect, in an eleventh implementation of the third aspect, the determining that the status of using the first target frequency band by the target cell is a used state includes:

receiving third signaling, and determining, according to the third signaling, that the status of using the first target frequency band by the target cell in the measurement time set is the used state.

With reference to the tenth implementation of the third aspect, in a twelfth implementation of the third aspect, the measurement time set includes a second preset time resource; and the measuring, according to a second measurement mode, the wireless condition of the first target frequency band corresponding to the target cell includes:

determining, according to the second measurement mode, a measurement resource corresponding to the second measurement mode, where the measurement resource includes a time resource, and the time resource is in the second preset time resource; and measuring, according to the measurement resource corresponding to the second measurement mode, the wireless condition of the first target frequency band corresponding to the target cell.

With reference to the twelfth implementation of the third aspect, in a thirteenth implementation of the third aspect, the second preset time resource includes at least one of the following:

a time resource between a start time and an end time of sending the reference signal or the reference information on the first target frequency band; or a time resource between the start time of sending the reference signal or the reference information on the first target frequency band and an end time of the measurement time set.

With reference to the twelfth implementation of the third aspect or the thirteenth implementation of the third aspect, in a fourteenth implementation of the third aspect, the determining that the status of using the first target frequency band by the target cell is a used state includes:

determining that the status of using the first target frequency band by the target cell on the second preset time resource is the used state.

With reference to the tenth implementation of the third aspect, in a fifteenth implementation of the third aspect, the measurement time set includes a third preset time resource; and the measuring, according to a third measurement mode, the wireless condition of the first target frequency band corresponding to the target cell includes:

determining, according to the third measurement mode, a measurement resource corresponding to the third measurement mode, where the measurement resource includes a time resource, and the time resource is in the third preset time resource; and measuring, according to the measurement resource corresponding to the third measurement mode, the wireless condition of the first target frequency band corresponding to the target cell.

With reference to the fifteenth implementation of the third aspect, in a sixteenth implementation of the third aspect, the third preset time resource includes:

a time resource between a start time of the measurement time set and a start time of sending the reference signal or the reference information on the first target frequency band.

With reference to the fifteenth implementation of the third aspect or the sixteenth implementation of the third aspect, in a seventeenth implementation of the third aspect, the determining unit is further configured to determine that the status of using the first target frequency band by the target cell on the third preset time resource is a dormant state.

With reference to any one of the third aspect or the seventeenth implementations of the third aspect, in an eighteenth implementation of the third aspect, the user equipment further includes a reporting unit, configured to report the measurement result when the measurement result meets a preset condition.

With reference to any one of the third aspect or the eighteen implementations of the third aspect, in a nineteenth implementation of the third aspect, the measurement time set is a discovery reference signal timing configuration DMTC.

With reference to any one of the third aspect or the nineteen implementations of the third aspect, in a twentieth implementation of the third aspect, the determining unit is further configured to determine second measurement configuration information corresponding to a second target frequency band, and the second measurement configuration information is configuring the user equipment to perform wireless condition measurement not according to the identification information of the target cell; and the measurement unit is further configured to perform wireless condition measurement on the second target frequency band.

According to a fourth aspect, a network side device is provided, where the network side device includes a sending unit; and the sending unit is configured to send a measurement time set and first measurement configuration information that are corresponding to a first target frequency band to user equipment, where the first measurement configuration information is configuring the user equipment to perform wireless condition measurement according to identification information of a target cell, so that the user equipment determines a status of using the first target frequency band by the target cell corresponding to the identification information, and the user equipment measures, in the measurement time set according to the status of using the first target frequency band by the target cell, a wireless condition of the first target frequency band corresponding to the target cell, to obtain a measurement result.

With reference to the fourth aspect, in a first implementation of the fourth aspect, the network side device further includes a receiving unit and a management unit;

the receiving unit is configured to receive the measurement result sent by the user equipment; and the management unit is configured to perform radio resource management on the user equipment according to the measurement result received by the receiving unit.

With reference to the fourth aspect or the first implementation of the fourth aspect, in a second implementation of the fourth aspect, the sending unit is further configured to send first signaling to the user equipment, and the first signaling is used to indicate that the identification information of the target cell is identification information of a neighboring cell.

With reference to the fourth aspect, the first implementation of the fourth aspect, or the second implementation of the fourth aspect, in a third implementation of the fourth aspect, the sending unit is further configured to send second signaling to the user equipment, and the second signaling is used to indicate that the status of using the first target frequency band by the target cell in the measurement time set is an unused state.

With reference to the fourth aspect or any one of the three implementations of the fourth aspect, in a fourth implementation of the fourth aspect, the sending unit is further configured to send third signaling to the user equipment, and the third signaling is used to indicate that the status of using the first target frequency band by the target cell in the measurement time set is a used state.

With reference to the fourth aspect or any one of the three implementations of the fourth aspect, in a fifth implementation of the fourth aspect, the sending unit is further configured to send second measurement configuration information corresponding to a second target frequency band to the user equipment, and the second measurement configuration information is configuring the user equipment to perform wireless condition measurement not according to the identification information of the target cell, so that the user equipment performs wireless condition measurement on the second target frequency band.

According to a fifth aspect, a measurement apparatus is provided, where the measurement apparatus includes a processor, a memory, a communications interface, and a bus, where the processor, the memory, and the communications interface communicate with each other by using the bus;

the communications interface is configured to communicate with a switch or a control server;

the memory is configured to store a program; and when the apparatus runs, the processor is configured to execute the program stored in the memory, to execute the measurement method according to the first aspect.

According to a sixth aspect, a measurement apparatus is provided, where the measurement apparatus includes a processor, a memory, a communications interface, and a bus, where the processor, the memory, and the communications interface communicate with each other by using the bus;

the communications interface is configured to communicate with a switch or a control server;

the memory is configured to store a program; and when the apparatus runs, the processor is configured to execute the program stored in the memory, to execute the measurement method according to the second aspect.

According to the measurement method, the user equipment, the network side device, and the measurement apparatus provided in the embodiments of the present disclosure, the user equipment determines the measurement time set and the first measurement configuration information that are corresponding to the first target frequency band, where the first measurement configuration information is configuring the user equipment to perform wireless condition measurement according to the identification information of the target cell; determines the status of using the first target frequency band by the target cell corresponding to the identification information; and measures, in the measurement time set according to the status of using the first target frequency band by the target cell, the wireless condition of the first target frequency band corresponding to the target cell, to obtain the measurement result. In this way, the user equipment can measure wireless conditions of different target frequency bands, so that mobility performance of the user equipment can be effectively improved.

DETAILED DESCRIPTION

Figure 1:
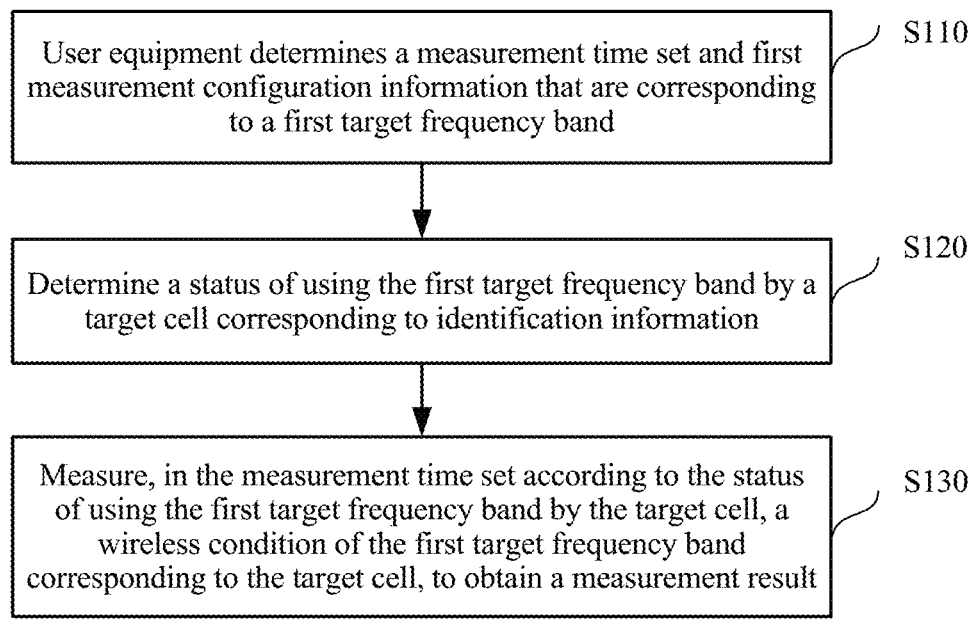
FIG. 1 is a flowchart of a measurement method according to Method Embodiment 1 of the present disclosure.

The following further describes the technical solutions of the present disclosure in detail with reference to the accompanying drawings and embodiments.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

To facilitate understanding of the embodiments of the present disclosure, the following further describes the embodiments in detail with reference to the accompanying drawings. The embodiments are not intended to limit the embodiments of the present disclosure.

A measurement method provided in the embodiments of the present disclosure is applied to a wireless communications system, and in particular, to a licensed-assisted access using Long Term Evolution (LAA-LTE) system. The LAA-LTE system is an LTE system in which a licensed frequency band and an unlicensed frequency band are jointly used by means of carrier aggregation (CA) or non-CA. Jointly using the licensed frequency band and the unlicensed frequency band by means of CA is also referred to as performing carrier aggregation on the licensed frequency band and the unlicensed frequency band. Herein, the licensed frequency band and the unlicensed frequency band each may include one or more carriers. The performing carrier aggregation on the licensed frequency band and the unlicensed frequency band may be performing carrier aggregation on one or more carriers included in the licensed frequency band and one or more carriers included in the unlicensed frequency band.

A mainstream deployment scenario of the LAA-LTE system is a scenario in which the licensed frequency band and the unlicensed frequency band are jointly used by means of CA. That is, the licensed frequency band, a carrier included in the licensed frequency band, or a cell operating on the licensed frequency band serves as a primary cell (Pcell), and the unlicensed frequency band, a carrier included in the unlicensed frequency band, or a cell operating on the unlicensed frequency band serves as a secondary cell (Scell). The primary cell and the secondary cell may be deployed in a same base station or different base stations. An ideal backhaul path exists between the two cells.

It should be noted that the cell mentioned above may be a cell corresponding to a base station, and the cell may belong to a macro base station or belong to a base station corresponding to a small cell. The small cell may be a metro cell, a micro cell, a pico cell, a femto cell, or the like. These small cells feature small coverage and low transmit power, and are applicable to providing high-rate data transmission services.

A plurality of cells may operate on a same frequency on a carrier in the LAA-LTE system. In some special scenarios, a carrier in the LAA-LTE system may be considered to have a same concept as a cell. For example, in the mainstream deployment scenario, when a carrier of the secondary cell is configured for user equipment, both a carrier index of the carrier of the secondary cell and a cell identifier (Cell ID) of the secondary cell are carried. In this case, the carrier may be considered to have a same concept as the cell. For example, access of the user equipment to a carrier is equivalent to access of the user equipment to a cell. In this specification, a concept of the cell is used for description.

However, the LAA-LTE system in the present disclosure is not limited to the mainstream deployment scenario. There may be another deployment scenario, for example, a scenario in which no ideal backhaul path exists between two cells (a primary cell and a secondary cell), for example, a backhaul delay is relatively large, and consequently, information cannot be coordinated rapidly between the two cells.

In addition, it may also be considered to independently deploy a cell operating on the unlicensed frequency band. In this case, the cell operating on the unlicensed frequency band can directly provide an independent access function without assistance of a cell operating on the licensed frequency band.

It should be noted that an example in which a network side device in the embodiments of the present disclosure is an LTE eNodeB is used for description. The network side device may be alternatively a device capable of providing a service of data for the user equipment. The data includes data carried on a service data channel and/or data carried on a control data channel. The network side device may be alternatively a device capable of providing measurement configuration information for the user equipment. The measurement configuration information includes at least a measurement time set and/or first measurement configuration information, and subsequently mentioned second measurement configuration information in this specification.

Method Embodiments

FIG. 1 is a flowchart of a measurement method according to Method Embodiment 1 of the present disclosure. The method may be executed by user equipment. The user equipment is any device, for example, relay user equipment, that can perform data communication with a network side device. In descriptions of this specification, the user equipment is general user equipment. As shown in FIG. 1, the method may specifically include the following steps.

S110. The user equipment determines a measurement time set and first measurement configuration information that are corresponding to a first target frequency band, where the first measurement configuration information is configuring the user equipment to perform wireless condition measurement according to identification information of a target cell.

S110 may be specifically that the user equipment determines a measurement time set and first measurement configuration information that are corresponding to one or more first target frequency bands. It may be understood that when there are a plurality of first target frequency bands, a plurality of measurement time sets and a plurality of pieces of first measurement configuration information may be determined for the plurality of first target frequency bands.

Herein, the first target frequency band is a frequency band resource used by the network side device such as an LTE eNodeB to send a signal, and may be represented by using a carrier frequency channel number or a carrier frequency. The first target frequency band may include an unlicensed frequency band or any carrier included in the unlicensed frequency band. Different carriers may be represented by using different frequency ranges, different channel numbers, or different carrier frequencies. This is not limited in this embodiment of the present disclosure. In descriptions of this specification, the first target frequency band is an unlicensed frequency band. The LTE eNodeB may use a plurality of carrier frequencies to send signals. If the plurality of carrier frequencies are unlicensed spectrum resources, when sending signals on the plurality of carrier frequencies, the LTE eNodeB may determine, by means of listen before talk (LBT), whether the signals can be sent.

In this embodiment of the present disclosure, an example in which the first target frequency band includes one carrier frequency in the unlicensed frequency band is used for description.

It should also be noted that, for the network side device, the first target frequency band may be a frequency band used by the network side device to send a discovery reference signal (DRS); for the user equipment, the first target frequency band may be a frequency band for which a DRS is configured or a frequency band for which a discovery reference signal measurement timing configuration (DMTC) is configured. It should be noted that, herein, even if the network side device needs to determine, by means of LBT, whether the DRS can be sent on the first target frequency band, the first target frequency band may be considered as a frequency band for sending the DRS.

Preferably, measurement time sets may be in a one-to-one correspondence with first target frequency bands. That is, one measurement time set is configured for one target frequency band at a moment. Considering a radio frequency capability and a baseband data processing capability of the UE, the UE can detect only a specific quantity of first target frequency bands to obtain a measurement result at a same moment. If the UE needs to detect more first target frequency bands, a measurement gap is required. That is, the UE needs to suspend detection performed on a current first target frequency band and detect another first target frequency band in the measurement gap. Therefore, for same UE, a measurement time set of a first target frequency band currently detected by the UE and a measurement time set of another target frequency band may be staggered. In addition, different UEs may currently detect different first target frequency bands. For example, UE1 currently detects first target frequency bands CC1 and CC2, and UE2 currently detects first target frequency bands CC2 and CC3. In terms of mobility performance of single UE, for the UE1, CC1 and CC2 may have a same measurement time set, but a measurement time set of CC3 and the measurement time set of CC1/CC2 need to be staggered; for the UE2, CC2 and CC3 may have a same measurement time set, but a measurement time set of CC1 and the measurement time set of CC2/CC3 need to be staggered. If the UE1 and the UE2 are served by a same LTE eNodeB, based on the foregoing consideration, measurement time sets corresponding to different first target frequency bands used by the LTE eNodeB may be staggered. This may be configured by the network side device such as the LTE eNodeB, or defined in a standard specification.

Preferably, the measurement time set may be periodically or aperiodically configured by the network side device. Particularly, in an LTE system, the measurement time set may be obtained by means of DMTC. That is, the measurement time set is a DMTC window. Certainly, in actual application, the measurement time set may be alternatively configured in another manner. This is not limited in the present disclosure.

On a same first target frequency band, different target cells may determine, in a same measurement time set by means of LBT, whether signals can be sent. The user equipment may detect the signals to identify different target cells. For example, when the measurement time set is a DMTC window, the signals may be DRSs. In this way, the user equipment can detect as many target cells as possible in the measurement time set of the first target frequency band, so that mobility performance of the user equipment is effectively ensured. Different target cells may use a same measurement time set configuration on a same first target frequency band by means of, for example, negotiation. Because mobility of the user equipment is mainly handing over back and forth between target cells of a same operator, different target cells may negotiate for a configured measurement time set by using a backhaul path (for example, an X2 interface or an SI interface) or by means of air interface signaling interaction, or the configured measurement time set may be defined in a standard specification.

It should also be noted that the first measurement configuration information is also configured by the network side device. The first measurement configuration information may be configuring the user equipment to perform wireless condition measurement according to the identification information of the target cell, that is, may be configuring the user equipment to measure the first target frequency band for the target cell. Specifically, in this case, the user equipment may determine, according to a status of using the first target frequency band by the target cell, a measurement mode in which the user equipment is to measure a wireless condition of the first target frequency band on which the target cell operates. Corresponding to the first measurement configuration information, measurement configuration information may be configuring the user equipment to perform wireless condition measurement not according to the identification information of the target cell. In this case, the user equipment can directly measure the wireless condition of the first target frequency band without determining the status of using the target frequency band by the target cell.

Content of the first measurement configuration information includes at least one of the following:

(1) The first measurement configuration information is used to instruct the user equipment to perform wireless condition measurement on a serving cell of the user equipment.

The serving cell is a cell that can provide a data service for the user equipment.

(2) The first measurement configuration information is used to instruct the user equipment to perform wireless condition measurement on a cell corresponding to a first physical cell identifier (PCI). The cell corresponding to the first physical cell identifier may include another cell that is different from the serving cell of the user equipment and that belongs to a same serving base station as the serving cell of the user equipment. The LTE eNodeB is used as an example. Based on a carrier aggregation capability of the LTE eNodeB, the LTE eNodeB may simultaneously send signals on a plurality of carrier frequencies, such as F1, F2, F3, and F4. Certainly, if the four carrier frequencies are unlicensed spectrum resources, before sending signals on the four carrier frequencies (which may be corresponding to the first target frequency band in this embodiment of the present disclosure), the LTE eNodeB needs to first determine, by means of LBT, whether the four carrier frequencies can be used to send data. As described above, in this embodiment of the present disclosure, a carrier may be considered to have a same concept as a cell in an LAA-LTE system, or more usually, a carrier may be considered to have a same concept as a cell in a CA scenario. Therefore, when the LTE eNodeB uses the four carrier frequencies (or carriers) to send signals, it may be considered that four cells belonging to the LTE eNodeB are sending signals. For example, sending signals may include sending DRSs. A carrier aggregation capability of the user equipment is usually smaller than the carrier aggregation capability of the LTE eNodeB. Therefore, even if the LTE eNodeB can simultaneously use the four carrier frequencies to send data, the user equipment served by the LTE eNodeB can receive a signal sent only by a cell within a carrier aggregation capability range of the user equipment. Assuming that the user equipment can simultaneously receive data sent on two carrier frequencies, for example, can simultaneously receive signals sent by cells operating on F1 and F2, the cells operating on F1 and F2 may be considered as serving cells of the user equipment. Measurement performed by the user equipment on F1 and F2 may be considered as intra-frequency measurement. Cells operating on F3 and F4 may be considered as cells belonging to a same serving base station as the serving cells of the user equipment. Measurement performed by the user equipment on F3 and F4 may be considered as inter-frequency measurement. In this case, the LTE eNodeB may notify the user equipment of identifiers of the cells operating on F3 and F4. In this embodiment of the present disclosure, that the cell corresponding to the first physical cell identifier is another cell belonging to the same serving base station as the serving cell of the user equipment brings the following beneficial effect: Because the serving cell and the cell corresponding to the first physical cell identifier belong to the same serving base station, in terms of mobility performance of the user equipment, the user equipment can be preferentially handed over between cells belonging to a same serving base station, or implement Scell handover, so that service data continuity of the user equipment can be ensured.

The foregoing example in which the cells operating on F1 and F2 are serving cells and the cells operating on F3 and F4 are other cells is used to describe measurement performed by the user equipment on the four carrier frequencies. However, this is not limited in the present disclosure. A person skilled in the art may alternatively use the cells operating on F1 and F3 as serving cells and use the cells operating on F2 and F4 as other cells, and so on. Details are not described herein. In addition, in this embodiment of the present disclosure, the cell corresponding to the first physical cell identifier and the serving cell of the user equipment may alternatively belong to different serving base stations, and the cell and the serving cell may operate on a same carrier frequency or different carrier frequencies.

(3) The first measurement configuration information is used to instruct the user equipment to perform wireless condition measurement on a cell corresponding to a second physical cell identifier (PCI). The second physical cell identifier is determined by the user equipment by means of signal detection. In this case, the first measurement configuration information may be used to instruct the user equipment to measure the first target frequency band for the target cell. The target cell is determined by the user equipment by means of signal detection. For example, according to the foregoing description, the LTE eNodeB may instruct, by using signaling, the user equipment to measure four carrier frequencies, and instruct, by using the first measurement configuration information, the user equipment to measure, on the four carrier frequencies, the cell that is corresponding to the second physical cell identifier and that can be detected by the user equipment.

The first measurement configuration information may be carried in at least one of the following manners:

(1) The first measurement configuration information may be carried in a measurement object configuration of the first target frequency band. Measurement object configurations are in a one-to-one correspondence with first target frequency bands. For example, in the LTE system, the user equipment may determine, according to information carried in an information element (IE) field (e.g., measObject-EUTRA), how to measure an LTE cell. In this case, the measurement object configuration may explicitly include the identification information of the target cell directly. The identification information of the target cell may be identification information of the serving cell, or the first physical cell identifier. After receiving the measurement object configuration, the user equipment may determine that the user equipment needs to perform, on the first target frequency band corresponding to the measurement object configuration, wireless condition measurement according to the identification information of the target cell, and further needs to perform wireless condition measurement only on the target cell corresponding to the identification information of the target cell that is included in the measurement object configuration. Alternatively, the measurement object configuration may implicitly indicate that the user equipment needs to perform wireless condition measurement on the target cell. For example, the measurement object configuration includes a measurement signal configuration. The measurement signal configuration carries the identification information of the target cell. There may be one or more measurement signal configurations. After the user equipment receives the measurement object configuration, if the user equipment determines that the measurement object configuration includes the measurement signal configuration, the user equipment may determine that the first target frequency band needs to be measured for the target cell. For another example, the measurement object configuration includes a DMTC window configuration and a DRS configuration. After receiving the measurement object configuration, if the user equipment learns that the measurement object configuration of the first target frequency band includes the DMTC window configuration or the DRS configuration, the user equipment may determine that the first target frequency band needs to be measured for the target cell.

(2) The first measurement configuration information may be carried in a configuration other than the measurement object configuration. Other configurations may be in a one-to-one correspondence with first target frequency bands. A specific manner may be the same as the foregoing. That is, one manner is explicit instruction. For example, the first measurement configuration information is used to directly instruct the user equipment to perform wireless condition measurement according to the identification information of the target cell. Identification information of target cells is in a one-to-one correspondence with the target cells. Therefore, in this embodiment of the present disclosure, instructing the user equipment to perform wireless condition measurement according to the identification information of the target cell is equivalent to instructing the user equipment to perform wireless condition measurement according to the target cell. In this manner, the first measurement configuration information may directly carry the identification information of the target cell. Another manner is implicit instruction. For example, the first measurement configuration information includes information related to the identification information of the target cell. After receiving the information, the user equipment may determine that wireless condition measurement needs to be performed, according to the target cell, on the first target frequency band corresponding to the first measurement configuration information.

According to the foregoing description, in this embodiment of the present disclosure, the target cell may include the serving cell that currently serves the user equipment, and may also include a neighboring cell that does not currently serve the user equipment but may potentially serve the user equipment in the future. In this embodiment of the present disclosure, the neighboring cell may be understood as a cell operating on another frequency different from a frequency on which the serving cell of the user equipment operates, that is, a cell that can be detected on a corresponding carrier frequency when the user equipment performs inter-frequency measurement or a cell notified by the network side device. The neighboring cell may be alternatively understood as another cell that operates on a same frequency as the serving cell of the user equipment but that is different from the serving cell of the user equipment. The neighboring cell and the serving cell may belong to a same serving base station or different serving base stations. For example, if the neighboring cell is understood as another cell belonging to a same serving base station as the serving cell of the user equipment, in the foregoing example, cells sending signals such as DRSs on F3 and F4 may be considered as neighboring cells of the user equipment. Correspondingly, the identification information of the target cell includes at least one of the following: the identification information of the serving cell and identification information of the neighboring cell.

The identification information of the target cell may be determined in one or more of the following manners:

(1) The user equipment may determine the identification information of the target cell according to the identification information of the serving cell. In this case, the identification information of the target cell is the identification information of the serving cell.

(2) The user equipment may determine the identification information of the target cell according to first signaling.

Herein, the first signaling may be used to indicate the identification information of the serving cell and/or the identification information of the neighboring cell.

(3) The user equipment may determine the identification information of the target cell by means of blind detection. In this case, the user equipment may determine the identification information of the target cell by means of signal detection. The target cell includes the serving cell and/or the neighboring cell. It should be noted that, for a manner of the blind detection, refer to a process, described in step S120, of determining, according to a reference signal or reference information on the first target frequency band, the status of using the first target frequency band by the target cell. Details are not described herein again.

The determined identification information of the target cell may include at least one of the following: a cell identifier (Cell ID) (for example, a physical cell identifier (PCI)) of the target cell, an evolved universal terrestrial radio access network (E-UTRAN) cell global identifier (ECGI) of the target cell, identification information of an operator to which the target cell belongs, or the like.

After configuring the measurement time set and the first measurement configuration information, the network side device delivers the measurement time set and the first measurement configuration information to the user equipment.

S120. Determine a status of using the first target frequency band by the target cell corresponding to the identification information.

In this embodiment of the present disclosure, the user equipment may determine, in two manners, the status of using the first target frequency band by the target cell. Manner 1 is determining, according to the reference signal or the reference information on the first target frequency band, the status of using the first target frequency band by the target cell. Manner 2 is determining, according to signaling sent by the network side device, the status of using the first target frequency band by the target cell.

Manner 1 may be specifically: detecting the reference signal or the reference information on the first target frequency band in the measurement time set, where the reference signal or the reference information carries the identification information of the target cell; and if the reference signal or the reference information is not detected, determining that the status of using the first target frequency band by the target cell is an unused state.

For Manner 1, the reference signal is used as an example, and the user equipment may receive, on the first target frequency band in the measurement time set, a reference signal that may be sent by the target cell, and perform a related operation on the received signal by using a reference signal stored on a user equipment side. It should be noted that, because LBT is required when the target cell sends the reference signal on the first target frequency band, the target cell may not send the reference signal in the measurement time set. Correspondingly, in this case, a signal received by the user equipment on the first target frequency band in the measurement time set does not include the reference signal sent by the target cell. Alternatively, if the target cell sends the reference signal in the measurement time set, correspondingly, the signal received by the user equipment on the first target frequency band in the measurement time set includes the reference signal sent by the target cell. In this case, the user equipment side performs, by using the stored reference signal, the related operation on the signal received on the first target frequency band. If the received signal includes the reference signal sent by the target cell, a result of the related operation may meet a preset condition. The preset condition may include that an energy value corresponding to the result of the related operation exceeds an energy threshold. If the received signal does not include the reference signal, a result of the related operation does not meet a preset condition, for example, is less than an energy threshold. The energy threshold may be an energy value corresponding to a related operation performed by the user equipment on received background noise by using the reference signal. Therefore, in Manner 1, the user equipment may determine, according to the result of the related operation performed on the received signal by using the stored reference signal, the status of using the first target frequency band by the target cell corresponding to the identification information carried in the reference signal. If the user equipment determines, according to the result of the related operation, that the target cell does not send the reference signal, the user equipment may further determine that the status of using the first target frequency band by the target cell is the unused state. If the user equipment determines, according to the result of the related operation, that the target cell sends the reference signal, the user equipment may determine that the status of using the first target frequency band by the target cell is a used state. Herein, the reference signal stored on the user equipment is the same as the reference signal sent by the target cell.

The reference signal is used as an example in the foregoing description. In another implementable manner, the UE may alternatively detect the reference information in the measurement time set. The reference information carries the identification information of the target cell. If the reference information is not detected, the UE determines that the status of using the first target frequency band by the target cell is the unused state, that is, determines that the target cell does not preempt an opportunity to use the first target frequency band. The reference information may include downlink control information (DCI). The DCI may be specifically transmitted by using a physical downlink control channel (PDCCH) or an enhanced physical downlink control channel (EPDCCH). The reference information may be alternatively other reference information and may be transmitted by using a physical broadcast channel (PBCH) or a channel that carries system information. The system information includes but is not limited to a system information block type 1 (SIB-1), a SIB-2, . . . , and a SIB-x, where x is a positive integer. In this manner, in an implementation, the user equipment may receive, on the first target frequency band in the measurement time set, reference information that may be sent by the target cell, and perform matching detection on the received information by using a format of reference information stored on a user equipment side. If the received information includes the reference information stored on the user equipment, the user equipment may perform detection to obtain the reference information from the received information by means of matching. If the received information does not include the reference information, the user equipment cannot obtain the reference information by means of matching. Correspondingly, the user equipment may determine the status of using the first target frequency band by the target cell corresponding to the identification information carried in the reference information. For example, if the user equipment does not obtain the reference information by means of matching, the user equipment may determine that the status of using the first target frequency band by the target cell is the unused state. If the user equipment obtains the reference information by means of matching, the user equipment may determine that the status of using the first target frequency band by the target cell is a used state. Herein, the format of the reference information stored on the user equipment is the same as that of the reference information sent by the target cell.

Based on this, Manner 1 may be alternatively described as follows:

receiving the reference signal or the reference information on the first target frequency band in the measurement time set, where the reference signal or the reference information carries the identification information of the target cell; and if the received reference signal or reference information does not meet a preset condition, determining that the status of using the first target frequency band by the target cell is the unused state.

It should be noted that, in this embodiment of the present disclosure, that the status of using the first target frequency band by the target cell is the used state includes that the target cell uses the first target frequency band to send data; that the status of using the first target frequency band by the target cell is the unused state includes that, because of a reason such as LBT, the target cell does not preempt an opportunity to send data on the first target frequency band, and therefore cannot use the first target frequency band to send data. The data includes a signal, and/or data sent by using a channel. Further, on the first target frequency band, the status of using the first target frequency band by the target cell may vary in different time ranges.

For example, when the measurement time set is a DMTC window, the user equipment may detect a discovery reference signal (DRS) on the first target frequency band in the DMTC window. The DRS carries the identification information of the target cell. If no DRS is detected, the user equipment determines that the status of using the first target frequency band by the target cell is the unused state, that is, determines that the target cell does not preempt, in the DMTC window, an opportunity to use the first target frequency band corresponding to the DMTC window. Certainly, in actual application, the status of using the first target frequency band by the target cell may be alternatively determined according to another reference signal. In this specification, an example in which the status of using the first target frequency band by the target cell is determined according to the DRS is used for description.

Figure 2:
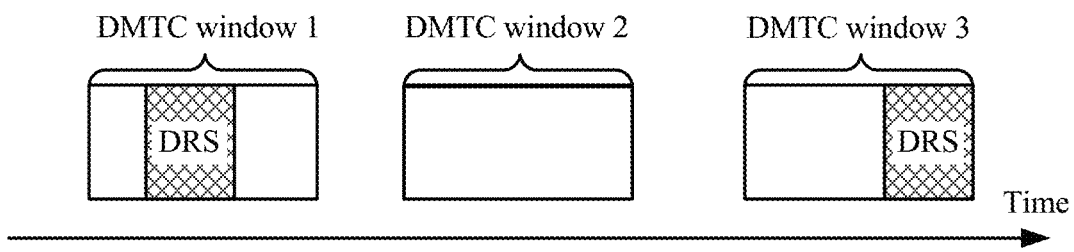
FIG. 2 is a schematic diagram 1 of DRS sending according to the present disclosure.
Figure 3:
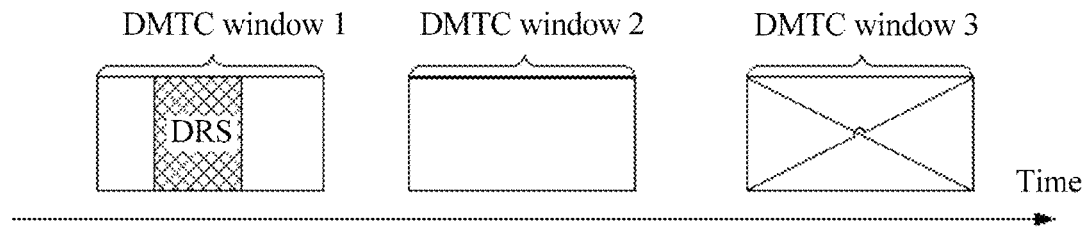
FIG. 3 is a schematic diagram 2 of DRS sending according to the present disclosure.

Referring to a schematic diagram 1 of DRS sending in FIG. 2, in FIG. 2, it is assumed that three measurement time sets configured at three preset moments (that is, periodically configured) by the network side device for a first target frequency band are a DMTC window 1, a DMTC window 2, and a DMTC window 3. In this case, the user equipment sequentially detects, in the three measurement time sets, a status of using the first target frequency band by at least one target cell. That is, all target cells that can operate on the first target frequency band may send DRSs in the DMTC window. As described above, necessary information exchange may be required, so that all the target cells operating on the first target frequency band can send DRSs in a same DMTC window, and therefore, the user equipment can detect as many target cells as possible in the same DMTC window. Further, it is assumed that a length of the DMTC window is 6 ms, and a DRS sending length is 3 ms, that is, DRS sending occupies three subframes (At present, as stipulated in a protocol, a maximum DRS sending length is 5 ms in a frequency division duplex (FDD) system and a time division duplex (TDD) system). Based on a characteristic of LBT, before sending a DRS, any target cell needs to determine, by means of listening, a status of using the first target frequency band (for example, an unlicensed frequency band). A DRS sending manner is as follows: If the any target cell detects an available spectrum resource in none of subframes included in a DMTC window, the target cell does not send a DRS in the DMTC window, for example, the DMTC window 2 in FIG. 2; if the any target cell detects an available frequency band in some subframes included in a DMTC window, the target may send a DRS from a moment when the available frequency band is detected and/or an allowed data transmission start location, for example, the DMTC window 1 and the DMTC window 3 in FIG. 2. The data transmission start location is a symbol boundary, a timeslot boundary, a subframe boundary, or the like. Another DRS sending method is sending a DRS on a fixed location in each DMTC window. Referring to a schematic diagram 2 of DRS sending in FIG. 3, it is assumed that a sending location of a DRS in a DMTC window is fixedly a sending location of the DRS in a DMTC window 1. In this case, corresponding to the status of using the first target frequency band by the any target cell in FIG. 2, even if an opportunity to use the first target frequency band is preempted in a DMTC window 3, the DRS cannot be sent in the DMTC window 3 because a DRS sending time is missed.

Optionally, the measurement time set may include a first preset time resource. The first preset time resource may include at least one of the following:

a time resource that is corresponding to a subframe in which a primary synchronization signal (PSS)/a secondary synchronization signal (SSS) included in the reference signal is located; or a time resource between a start time of the measurement time set and a start time of the subframe in which the PSS/the SSS included in the reference signal is located.

Figure 4A:
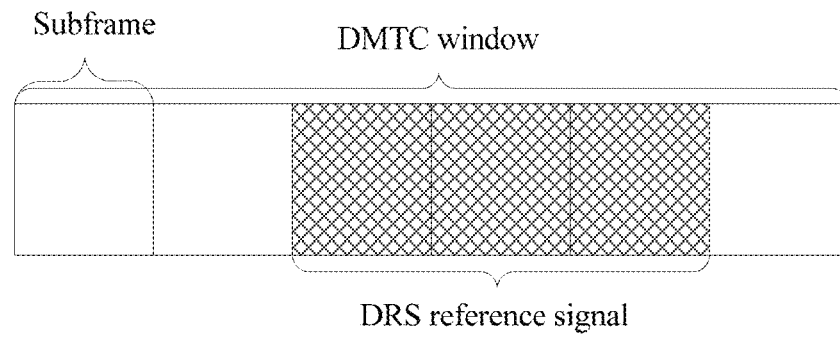
FIG. 4a is a schematic diagram 1 of a measurement time set according to the present disclosure.

Referring to a schematic diagram 1 of a measurement time set in FIG. 4a, in an example in FIG. 4a, the measurement time set is a DMTC window. It is assumed that the DMTC window includes six subframes (a time length of each subframe is 1 ms), DRS transmission occupies 3 ms, and a DRS is sent on a fixed location in the DMTC window. In FIG. 4a, an example in which a start subframe including the DRS is a third subframe in the DMTC window is used for description. A PSS/an SSS included in the DRS is located in a first subframe of DRS transmission duration (DRS duration), that is, the third subframe in the DMTC window. In this implementation, the subframe in which the PSS/the SSS is located is used as an example for description. In addition, the first preset time resource may include a time resource that is corresponding to an orthogonal frequency division multiplexing (OFDM) symbol in which the PSS/the SSS included in the reference signal is located; or a time resource between the start time of the measurement time set and the OFDM symbol in which the PSS/the SSS included in the reference signal is located.

Figure 4B:
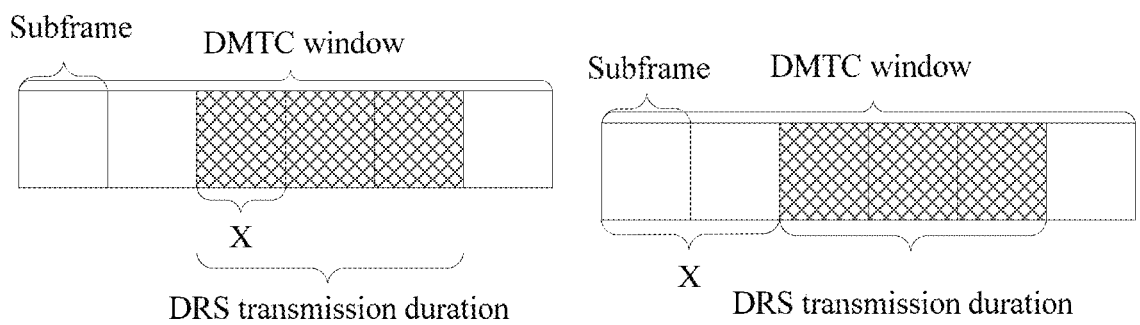
FIG. 4b is a schematic diagram 2 of a measurement time set according to the present disclosure.

In this case, a first preset time resource in FIG. 4a may be a time resource marked as X in a left diagram of FIG. 4b or a time resource marked as X in a right diagram of FIG. 4b.

A main characteristic of the first preset time resource is as follows: The status of using the first target frequency band by the target cell on the first preset time resource is the unused state, that is, the target cell does not send data on the first preset time resource, where the data includes a signal, and/or data sent by using a channel. A DMTC window is used as an example, and it is assumed that a DRS is to be sent on a fixed location in the DMTC window. If the target cell does not preempt an unlicensed frequency band resource before the fixed location in which the DRS is to be sent in the DMTC window, the target cell cannot send the DRS in the DMTC window. In this case, all time resources included in the DMTC window may be used as the first preset time resource. In addition, in the LAA-LTE system, an LBT mechanism used for sending a DRS may be different from that used for sending normal data. The normal data includes data carried on a control data channel and/or a service data channel. Therefore, the DRS may not be sent but the normal data may be sent in the DMTC window. To ensure that the target cell does not send any data, including the DRS and the normal data, on the used first preset time resource when the user equipment determines that the status of using the target frequency band by the target cell is the unused state, a time resource corresponding to a subframe in which a PSS/an SSS included in the DRS is located may be used as the first preset time resource for the following reason: If the PSS/the SSS is not sent, it indicates that no normal data is sent in the subframe for sending the PSS/the SSS. Therefore, using the time resource that is corresponding to the subframe in which the PSS/the SSS is located as the first preset time resource can ensure measurement accuracy.

When the measurement time set includes the first preset time resource, the determining that the status of using the first target frequency band by the target cell is an unused state in Manner 1 may further include:

determining that the status of using the first target frequency band by the target cell on the first preset time resource is the unused state.

In addition, Manner 1 may be specifically: detecting the reference signal or the reference information on the first target frequency band in the measurement time set, where the reference signal or the reference information carries the identification information of the target cell; and if the reference signal or the reference information is detected, determining that the status of using the first target frequency band by the target cell is a used state.

For example, when the measurement time set is a DMTC window, the user equipment may detect a discovery reference signal (DRS) on the first target frequency band in the DMTC window. The DRS carries the identification information of the target cell. If the DRS is detected, the user equipment determines that the status of using the first target frequency band by the target cell is the used state, that is, determines that the target cell preempts, in the DMTC window, an opportunity to use the first target frequency band corresponding to the DMTC window. Certainly, in actual application, the status of using the first target frequency band by the target cell may be alternatively determined according to another reference signal. In this specification, an example in which the status of using the first target frequency band by the target cell is determined according to the DRS is used for description.

It may be understood that, it may be alternatively determined, by detecting the reference information, that the status of using the first target frequency band by the target cell is the used state. A description about the reference information is the same as the foregoing, and details are not described herein again.

Optionally, the measurement time set may further include a second preset time resource. The second preset time resource includes at least one of the following:

a time resource between a start time and an end time of sending the reference signal or the reference information on the first target frequency band; or a time resource between the start time of sending the reference signal or the reference information on the first target frequency band and an end time of the measurement time set.

It should be noted that, in this embodiment of the present disclosure, the start time and the end time of sending the reference signal or the reference information may be represented by a first subframe and a last subframe in which reference signal or the reference information is located, may be represented by a first OFDM symbol and a last OFDM symbol in which the reference signal or the reference information is located, or may be represented by another time unit.

Figure 4C:
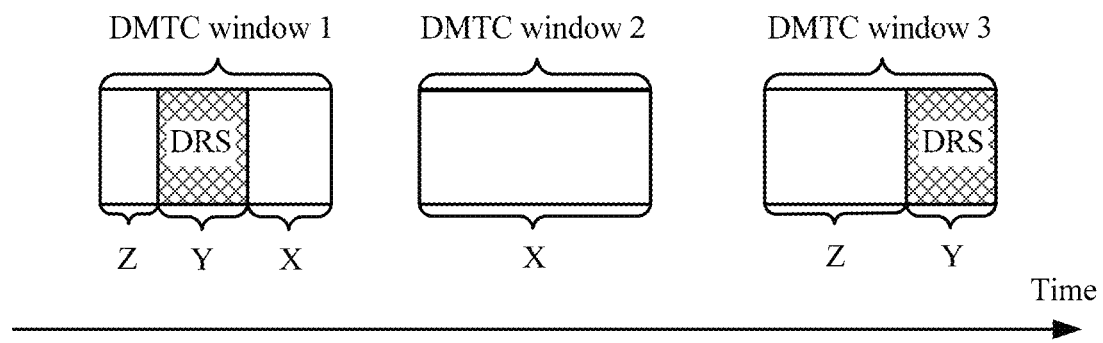
FIG. 4c is a schematic diagram 3 of a measurement time set according to the present disclosure.

Referring to a schematic diagram 3 of a measurement time set in FIG. 4c, an example in which the status of using the first target frequency band by the target cell is determined by detecting whether there is a reference signal DRS is used for description. Time resources marked as Y in a DMTC window 1 and a DMTC window 3 may be second preset time resources. The second preset time resource included in the DMTC window 1 is a time resource between a start time and an end time of sending the DRS (that is, the reference signal) on a first target frequency band corresponding to the DMTC window 1. The second preset time resource included in the DMTC window 3 is a time resource between a start time of sending the DRS on a first target frequency band corresponding to the DMTC window 3 and an end time of the measurement time set.

A main characteristic of the second preset time resource is that the status of using the first target frequency band by the target cell on the second preset time resource is the used state.

When the measurement time set includes the second preset time resource, the determining that the status of using the first target frequency band by the target cell is a used state in Manner 1 may further include:

determining that the status of using the first target frequency band by the target cell on the second preset time resource is the unused state.

Optionally, the measurement time set may further include a third preset time resource. The third preset time resource includes:

a time resource between a start time of the measurement time set and a start time of sending the reference signal or the reference information on the first target frequency band.

In FIG. 4c, an example in which the status of using the first target frequency band by the target cell is determined by detecting whether there is a reference signal DRS is still used for description. Time resources marked as Z in the DMTC window 1 and the DMTC window 3 may be third preset time resources. In addition, each of the third preset times resources in FIG. 4c is a time resource between a start time of the measurement time set and the start time of sending the DRS (that is, the reference signal) on the first target frequency band.

A main characteristic of the third preset time resource is that the status of using the first target frequency band by the target cell on the third preset time resource is a dormant state.

The dormant state is a state other than the used state of the target cell in the measurement time set. When the target cell is in the dormant state, the target cell does not send data.

When the measurement time set includes the third preset time resource, the method in this embodiment of the present disclosure may further include:

determining that the status of using the first target frequency band by the target cell on the third preset time resource is the dormant state.

For example, that the status of using the first target frequency band by the target cell on the third preset time resource is the dormant state means that the target cell does not send any signal or data on the time resources marked as Z in FIG. 4c.

In conclusion, a process of determining, in Manner 1, the status of using the first target frequency band by the target cell is mainly described in the foregoing steps. The following describes a process of determining, in Manner 2, the status of using the first target frequency band by the target cell.

Manner 2 may be specifically: receiving second signaling, and determining, according to the second signaling, that the status of using the first target frequency band by the target cell in the measurement time set is an unused state.

Herein, the second signaling may be delivered by the network side device. In a specific implementation, the second signaling is used to directly indicate that the status of using the first target frequency band by the target cell is the unused state. That is, if the UE detects the second signaling, the UE can determine that the status of using the first target frequency band by the target cell is the unused state. In another specific implementation, the second signaling carries the status of using the first target frequency band by the target cell. That is, the status of using the first target frequency band by the target cell may be determined according to 1-bit information carried in the second signaling. Specifically, if the 1-bit information is set to 1, it indicates that the status of using the first target frequency band by the target cell is the unused state.

In this manner, the second signaling may directly indicate a measurement pattern (pattern) used when the status of using the first target frequency band by the target cell is the unused state (for example, represented by OFF). The measurement pattern includes the measurement time set.

Alternatively, Manner 2 may be specifically: receiving third signaling, and determining, according to the third signaling, that the status of using the first target frequency band by the target cell in the measurement time set is a used state.

Herein, the third signaling may also be delivered by the network side device. In a specific implementation, the third signaling is used to directly indicate that the status of using the first target frequency band by the target cell is the used state. That is, if the UE detects the third signaling, the UE can determine that the status of using the first target frequency band by the target cell is the used state. In another specific implementation, the third signaling carries the status of using the first target frequency band by the target cell. That is, the status of using the first target frequency band by the target cell may be determined according to 1-bit information carried in the third signaling. Specifically, if the 1-bit information is set to 0, it indicates that the status of using the first target frequency band by the target cell is the used state.

In addition, in Manner 2, in order that the UE can learn a status of using the first target frequency band by a neighboring cell in the measurement time set, before notifying the foregoing signaling (including the second signaling and the third signaling), the serving cell of the UE obtains the status of using the first target frequency band by the neighboring cell or a measurement time set that is of the neighboring cell and that is corresponding to the using status. That is, the serving cell may exchange information with the neighboring cell. For example, if the serving cell and the neighboring cell of the UE belong to a same serving base station, the second signaling and/or the third signaling may be sent by using the serving base station, or the second signaling and/or the third signaling may be sent by using the serving cell. For the latter, if the UE needs to learn the status of using the first target frequency band by the neighboring cell in the measurement time set, the serving cell needs to first learn the status of using the first target frequency band by the neighboring cell in the measurement time set. However, because the serving cell and the neighboring cell belong to the same serving base station, for example, are aggregated by means of CA, a time required for interaction is quite short or negligible. However, if the serving cell and the neighboring cell belong to different serving base stations, the serving cell needs to interact with the neighboring cell by using a backhaul path (for example, SI interface or X2 interface), to learn the using status or the measurement time set corresponding to the using status.

S130. Measure, in the measurement time set according to the status of using the first target frequency band by the target cell, a wireless condition of the first target frequency band corresponding to the target cell, to obtain a measurement result.

Herein, the wireless condition measurement includes signal and/or interference energy detection performed on the first target frequency band for the target cell. The interference energy detection includes interference energy received by the user equipment if the target cell serves as a potential serving cell. The interference energy may include energy used by the target cell to send a signal to the user equipment side, or may include energy used by the target cell and another target cell that sends data on the first target frequency band to send signals to the user equipment side.

S130 may further include:
when it is determined that the status of using the first target frequency band by the target cell is the unused state, measuring, according to a first measurement mode, the wireless condition of the first target frequency band corresponding to the target cell, where the first measurement mode is a mode of measuring energy of the first target frequency band.

Herein, that the status of using the first target frequency band by the target cell is the unused state may be determined in either of the two manners in step 120.

The first measurement mode may include related measurement or detection based on target authorization, such as physical measurement, spectrum analysis, or spectrum sensing, for example, physical-layer energy detection (energy sensing or energy detection), covariance matrix detection, matched filter detection, cyclostationary feature detection, eigenvalue based spectrum sensing, received signal strength indication (RSSI), interference measurement, or rise over thermal (ROT).

It should be noted that the first measurement mode can help the UE accurately learn, when the status of using the first target frequency band by the target cell is the unused state, interference energy that comes from another cell, and can help the UE learn a load status of the target frequency band.

Further, the measuring, according to a first measurement mode, the wireless condition of the first target frequency band corresponding to the target cell may include:
determining, according to the first measurement mode, a measurement resource corresponding to the first measurement mode, where the measurement resource includes a time resource, and the time resource is in the first preset time resource; and
measuring, according to the measurement resource corresponding to the first measurement mode, the wireless condition of the first target frequency band corresponding to the target cell.

Herein, that the time resource is in the first preset time resource means that the time resource that is included in the measurement resource corresponding to the first measurement mode may be a part or all of the first preset time resource. In addition, the measurement resource corresponding to the first measurement mode may further include a frequency resource. The frequency resource may be all or some frequency resources of the first target frequency band. The measurement resource of the first measurement mode (interference energy measurement) may be notified to the UE by using signaling so that the UE learns the measurement resource; or a relative time/frequency resource relationship between the measurement resource and a determined resource for sending the reference signal may be predefined; or the measurement resource may be defined in another manner.

In addition, S130 may further include:

when it is determined that the status of using the first target frequency band by the target cell is the used state, measuring, according to a second measurement mode, the wireless condition of the first target frequency band corresponding to the target cell, where the second measurement mode is a mode of measuring the first target frequency band according to a signal of the target cell.

Herein, that the status of using the first target frequency band by the target cell is the used state may also be determined in either of the two manners in step 120.

In addition, the second measurement mode is a mode of measuring, according to a reference signal or reference information sent by the target cell on the first target frequency band, energy of the first target frequency band corresponding to the target cell. The reference signal is used as an example, and the second measurement mode may include radio resource management (RRM) measurement and/or channel state information (CSI) measurement. The RRM measurement may be performed according to reference signal received power (RSRP) and/or reference signal received quality (RSRQ) of a DRS, a cell common reference signal (CRS), a channel state information reference signal (CSI-RS), and/or a demodulation reference signal (DMRS). LTE user equipment UE usually measures interference energy of a current serving cell and a neighboring cell by means of RRM measurement, so as to support serving cell selection, handover, and the like for the UE.

It should be noted that the reference signal used when the wireless condition of the first target frequency band corresponding to the target cell is measured according to the second measurement mode may be different from the reference signal used in the process of determining the status of using the first target frequency band by the target cell, or may be the same as the reference signal or the reference information used in the process of determining the status of using the first target frequency band by the target cell. For example, the two are the same. As described above, the UE may determine, by detecting whether there is a DRS on the first target frequency band in the DMTC window, the status of using the first target frequency band by the target cell, where the DRS carries the identification information of the target cell. Once the UE determines that the status of using the first target frequency band by the target cell is the used state, that is, the UE determines that the status of using the first target frequency band by the target cell on the second preset time resource is the used state, the UE can perform RSRP and/or RSRQ measurement on all or a part of the second preset time resource according to a DRS sent by the target cell. A frequency resource used during the measurement may be all or some frequency resources on the second preset time resource.

It should be noted that the second preset time resource herein is a time in which the target cell sends a signal and another cell is listening. If energy obtained by means of listening exceeds a CCA threshold, the another cell may consider that the status of using the first target frequency band by the target cell in this time is the used state. However, on the second preset time resource, the target cell is not required to send signals on all frequency resources included in the time, because for the first target frequency band, there is a specification for testing whether a frequency band is occupied. Assuming that the test specification requires data to be sent only on an X MHz frequency band, even if the target cell sends a signal only on some frequency resources such as some resource elements (RE) in the X MHz frequency band, the another cell can perform energy detection on the signal sent by the target cell, so as to identify the status of using the first target frequency band by the target cell, if sending energy on the whole X MHz frequency band can meet the test specification. In this case, the user equipment may further perform interference energy measurement by using a resource on which no data is sent in the second preset time resource. The resource on which no data is sent may be represented by an RE. Usually, an RSSI measurement result includes a signal sent by the serving cell of the user equipment. Therefore, in this implementation, the interference energy measurement performed by using the resource on which no data is sent may be considered as RSSI-like measurement. For example, assuming that existence of a DRS is determined by means of DRS detection in the DMTC window, in addition to using the DRS to perform RSRP and/or RSRQ measurement, RSSI-like measurement may be performed based on an RE on which no data is sent in a time range occupied by the DRS.

The RSRQ measurement may include RSRP measurement and RSSI measurement. Because the RSRP measurement is performed based on a reference signal, although a measurement resource corresponding to the RSSI measurement may be an OFDM symbol that includes a reference signal and/or an OFDM symbol that does not include a reference signal, in terms of the RSRP measurement, in this embodiment of the present disclosure, the second measurement mode in this implementation is understood as "measurement performed according to the reference signal or the reference information of the target cell". Specifically, measurement resources used for the RSRP measurement and the RSSI measurement may be indicated by the serving cell of the UE or the serving base station to which the serving cell belongs, or may be indicated by a Pcell or an Scell served by the serving base station. For example, a definition of an RRM measurement resource for Release 12 UE in the existing 3GPP standard or a future possible definition of an RRM measurement resource for UE of a release later than Release 12 is used.

Further, the measuring, according to a second measurement mode, the wireless condition of the first target frequency band corresponding to the target cell may include:

determining, according to the second measurement mode, a measurement resource corresponding to the second measurement mode, where the measurement resource includes a time resource, and the time resource is in the second preset time resource; and measuring, according to the measurement resource corresponding to the second measurement mode, the wireless condition of the first target frequency band corresponding to the target cell.

Herein, that the time resource is in the second preset time resource means that the time resource that is included in the measurement resource corresponding to the second measurement mode may be a part or all of the second preset time resource. In addition, the measurement resource corresponding to the second measurement mode may further include a frequency resource. The frequency resource may be all or some frequency resources of the first target frequency band.

Optionally, S130 may further include:
when it is determined that the status of using the first target frequency band by the target cell is the used state, measuring, according to a third measurement mode, the wireless condition of the first target frequency band corresponding to the target cell, where the third measurement mode is a mode of measuring energy of the first target frequency band.

Herein, that the status of using the first target frequency band by the target cell is the used state may be determined in either of the two manners in step 120. The third measurement mode may be the same as the first measurement mode. Details are not described herein.

It should be noted that, the measuring, according to a third measurement mode, the wireless condition of the first target frequency band corresponding to the target cell is also performed when the status of using the first target frequency band by the target cell is the used state. That is, the wireless condition of the first target frequency band corresponding to the target cell is measured according to two measurement modes. Therefore, measurement accuracy can be improved.

Further, the measuring, according to a third measurement mode, the wireless condition of the first target frequency band corresponding to the target cell may include:
determining, according to the third measurement mode, a measurement resource corresponding to the third measurement mode, where the measurement resource includes a time resource, and the time resource is in the third preset time resource; and
measuring, according to the measurement resource corresponding to the third measurement mode, the wireless condition of the first target frequency band corresponding to the target cell.

Herein, that the time resource is in the third preset time resource means that the time resource that is included in the measurement resource corresponding to the third measurement mode may be a part or all of the third preset time resource. In addition, the measurement resource corresponding to the third measurement mode may further include a frequency resource. The frequency resource may be all or some frequency resources of the first target frequency band.

Figure 5:
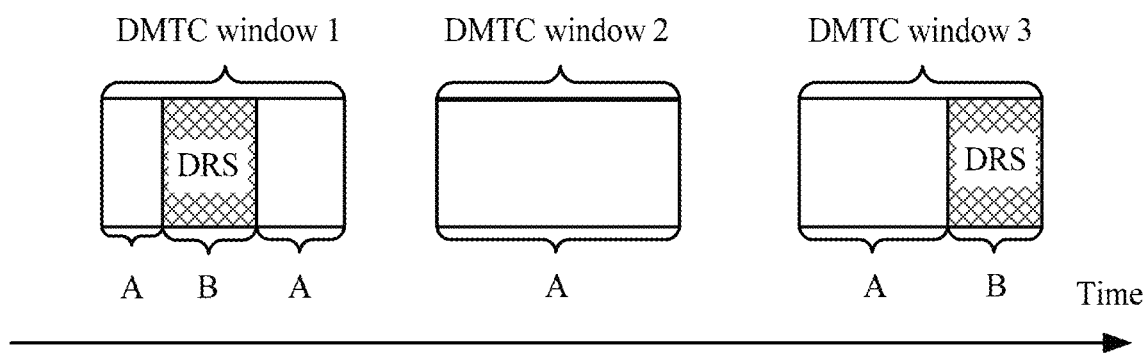
FIG. 5 shows a measurement mode corresponding to a first target frequency band in FIG. 2.

FIG. 5 shows a measurement mode corresponding to the first target frequency band in FIG. 2. In FIG. 5, it is assumed that a measurement time set includes only a first preset time resource and a second preset time resource, A represents the first measurement mode, and B represents the second measurement mode. On a first preset time resource in a DMTC window 1, the wireless condition of the first target frequency band corresponding to the target cell may be measured according to A. On a second preset time resource in the DMTC window 1, the wireless condition of the first target frequency band corresponding to the target cell may be measured according to B. On a first preset time resource in a DMTC window 2, the wireless condition of the first target frequency band corresponding to the target cell may be measured according to A, and the first preset time resource is all time resources. On a first preset time resource in a DMTC window 3, the wireless condition of the first target frequency band corresponding to the target cell may be measured according to A. On a second preset time resource in the DMTC window 3, the wireless condition of the first target frequency band corresponding to the target cell may be measured according to B.

Optionally, after S130, the method may further include:
reporting the measurement result when the measurement result meets a preset condition.

Herein, the user equipment may report the measurement result to the network side device when the measurement result meets the preset condition.

That the measurement result meets the preset condition may mean that the measurement result meets a preset threshold (also referred to as event triggering), for example, the measurement result is greater than or less than the preset threshold; or may mean that a current time is a preset reporting moment (also referred to as periodic triggering). For the periodic triggering, it is determined that the measurement result meets the preset condition when a period arrives regardless of the measurement result. Preferably, if a measurement time set is periodically configured, the UE may report the measurement result to the network side device after each measurement time set. Alternatively, the event triggering may be combined with the periodic triggering. That is, when the period arrives, the UE first determines whether the measurement result meets the preset threshold; and if the measurement result meets the preset threshold, the UE reports the measurement result to the network side device; or if the measurement result does not meet the preset threshold, the UE does not report the measurement result. Herein, the measurement result reported to the network side device may be an average value of measurement results obtained in a plurality of measurement time sets, or a measurement result, obtained in a single measurement time set, that is also referred to as an instantaneous value (one-shot measurement value). In addition, when reporting the measurement result to the network side device, the user equipment may directly report the average value of the plurality of measurement results or the instantaneous value; may report an index value of a measurement result, where different index values are corresponding to different measurement results or different measurement result ranges; may perform reporting if a measurement time result is greater than or less than a preset threshold; or may perform reporting according to proportions, for example, collect, according to different preset thresholds, statistics about proportions of measurement results that are greater than or less than the different preset thresholds in all measurement results in a measurement time set, where the proportions are indicated, for example, in a histogram or by using a cumulative distribution function (CDF). After receiving the measurement result, the network side device may manage mobility of the UE, for example, assist in operations such as cell handover and cell selection of an eNB.

In this embodiment of the present disclosure, the UE can obtain the status of using the first target frequency band by the target cell. The target cell includes the serving cell and the neighboring cell. Therefore, compared with the prior art, wireless conditions of the first target frequency band for different cells in different time periods may be distinguished, so as to improve mobility performance of the UE. For example, the UE determines, by detecting whether there is a DRS in the DMTC window, the status of using the first target frequency band by the target cell. The DRS carries the identification information of the target cell. In the DMTC window, all target cells that may operate on the first target frequency band may send DRSs. Therefore, the UE may obtain active and inactive time periods of all the target cells that may operate on the first target frequency band, and further perform RRM measurement for different states of using the first target frequency band by the target cells. It should be noted that, if the user equipment does not detect a DRS in the DMTC window, the user equipment may determine, based on historical detection information, that no target cell is detected. As shown in FIG. 2, if the UE detects, in the DMTC window 1, that the target cell preempts the first target frequency band (that is, the status of using the first target frequency band by the target cell is the used state), but detects, in the DMTC window 2, that the target cell does not preempt the first target frequency band, the UE may determine that the target cell may send data on the first target frequency band. Therefore, the UE may use all or some time-frequency resources in the DMTC window 2 to start the first measurement mode to perform RRM measurement on the target cell when the target cell does not preempt the first target frequency band.

Optionally, Embodiment 1 of the present disclosure may further include:

determining, by the user equipment, second measurement configuration information corresponding to a second target frequency band, where the second measurement configuration information is configuring the user equipment to perform wireless condition measurement not according to the identification information of the target cell; and performing, by the user equipment, wireless condition measurement on the second target frequency band.

The second target frequency band is a frequency band different from the first target frequency band. The serving base station of the user equipment does not send data on the second target frequency band, for example, F5 in the described below example. Herein, for the network side device, the second target frequency band may be corresponding to a frequency band on which the network side device does not send a DRS; or for the user equipment, the second target frequency band may be a frequency band for which a DRS is not configured or a frequency band for which a DMTC is configured.

The second measurement configuration information may include information about the second target frequency band (for example, carrier frequency information of the second target frequency band) and may be used to instruct the user equipment to measure only energy of the second target frequency band.

The performing, by the user equipment, wireless condition measurement on the second target frequency band is performing wireless condition measurement on a frequency resource of the second target frequency band not for the target cell.

It should be noted that, using the measurement method in this embodiment of the present disclosure can not only assist in carrier selection, but also resolve, in advance, a hidden node problem that may occur in a serving cell selection or carrier selection process.

In the LAA-LTE system, as described above, because the carrier aggregation capability of the serving base station is limited, the serving base station may be incapable of occupying all carrier resources of the unlicensed frequency band to perform sending. As described in the foregoing example, the serving base station sends signals on F1 to F4 but sends no signal on F5. Correspondingly, the user equipment served by the serving base station can detect, on F5, only energy information of F5, and the energy information does not include a signal sent by the serving base station. To perform fair comparison for carrier selection, the user equipment further needs to measure energy information of F1 to F4. In this case, the user equipment needs to determine a using status of the unlicensed frequency band for serving cells that belong to the serving base station that operate on F1 to F4. If it is determined that the using status is the unused state, a result obtained by means of measurement is energy information of the target frequency band. In this way, the result can be fairly compared with a result of detection on F5. If it is determined that the using status is the used state, a result obtained by means of measurement may be a normal RRM measurement result, which facilitates serving cell handover and the like. Base on this, according to the method in this embodiment of the present disclosure, the UE can perform different measurement modes according to different states of using the target frequency band by the target cell, so as to ensure measurement result accuracy and further ensure mobility performance of the UE.

In addition, according to this embodiment of the present disclosure, the hidden node problem may further be resolved in advance. In the LAA-LTE system, because the network side device (including the serving cell and the neighboring cell) and the UE have different geographical locations, the network side device and the UE also have different listening ranges. Consequently, the hidden node problem occurs. Specifically, in the LAA-LTE system, for example, downlink data is sent. Before sending data, the network side device (eNB) needs to determine, by means of CCA, whether the unlicensed frequency band is occupied by another device (that is, determine whether the unlicensed frequency band is in the used state). The CCA may be implemented by means of energy detection and/or signal detection. If the CCA is implemented by means of energy detection, the eNB receives energy on the unlicensed frequency band before sending data. When the received energy is greater than an energy threshold, it may be considered that the listened unlicensed frequency band is occupied by another device. If the CCA is implemented by means of signal detection, before sending data, the eNB may perform preamble sequence detection on a signal received on the unlicensed frequency band. If a corresponding preamble is detected, it may also be considered that the unlicensed frequency band is occupied by another device. Because the network side device and the UE have different geographical locations, the hidden node problem occurs in a method for determining, by means of LBT, whether the unlicensed frequency band is occupied.

Figure 6:
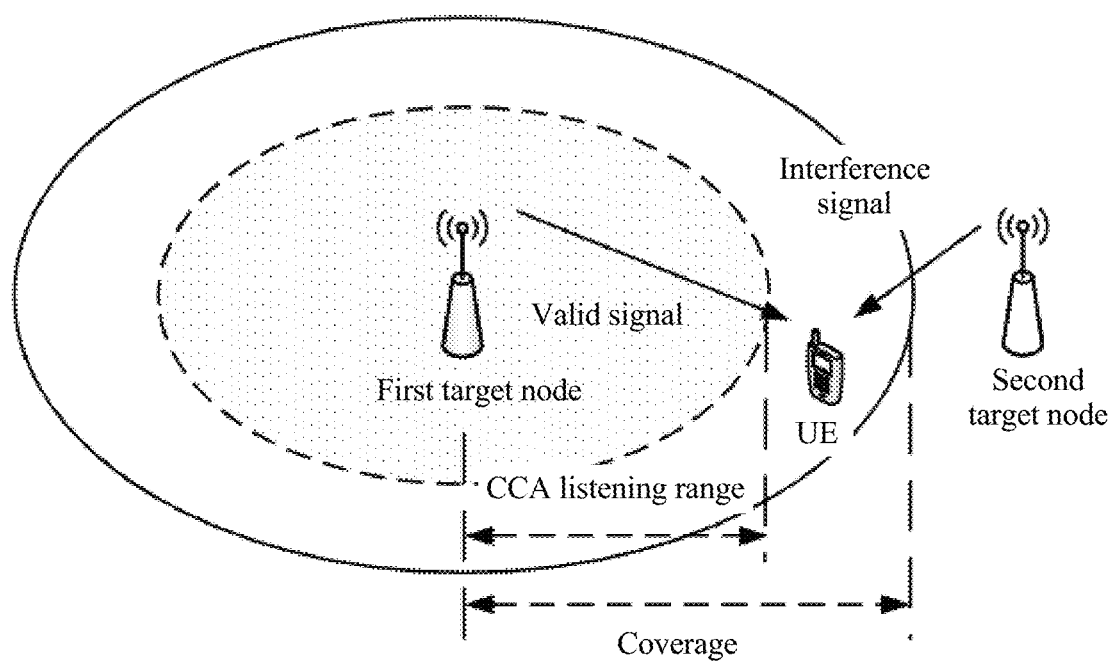
FIG. 6 is a schematic diagram 1 of a hidden node according to the present disclosure.

Referring to a schematic diagram 1 of a hidden node in FIG. 6, in FIG. 6, a CCA listening range (range) of a first target node (Node 1) indicates that the node 1 can detect all signals sent by a node in the CCA range. That is, assuming that the node in the CCA range preempts an unlicensed frequency band in advance, when listening to the unlicensed frequency band, the node 1 may always detect that the node in the CCA range preempts the unlicensed frequency band, and therefore may determine that a using status of the unlicensed frequency band is a used state. In addition, for a node that falls beyond the CCA range of the node 1, for example, a second target node (Node 2), because a signal that is sent by the node 2 to the node 1 attenuates, when arriving at the node 1, the signal sent by the node 2 has an energy value that is less than an energy threshold during CCA or that is less than a minimum signal to interference plus noise ratio (SINR) required for parsing the signal. That is, even if the node 2 preempts an unlicensed frequency band and sends a signal, when performing CCA on the unlicensed frequency band, the node 1 may consider that a using status of the unlicensed frequency band is an unused state, or that the unlicensed frequency band is idle or is unoccupied by another device. In this case, the node 1 may still use the unlicensed frequency band to send data. That is, because the listening range of the node 1 is limited, the node 1 and the node 2 may simultaneously use the same unlicensed frequency band to send data. In this case, UE served by the node 1 (as shown in FIG. 6), especially UE relatively close to the node 2, may receive interference from the node 2. The node in FIG. 6 may be an eNB or a Wi-Fi access point (AP). Apparently, in this case, quality of data communication between the node 1 and the UE may be relatively greatly affected.

In the prior art, to resolve the hidden node problem, RSRQ measurement is performed according to a detected DRS in a DMTC window to determine a hidden node; or as described in the background, a serving cell instructs UE to perform energy detection on a specified carrier only in an inactive period of the serving cell. The prior art has the following disadvantage: For the RSRQ measurement performed according to the DRS, because LBT is also required before the DRS is sent, the DRS may not be detected in the DMTC window. Therefore, the RSRQ measurement relying only on the DRS is limited. In addition, as described in the background, the serving cell cannot learn an inactive period of another cell, and therefore can learn a using status of only one carrier corresponding to the another cell. However, the using status of only one carrier is insufficient to assist the UE in determining the hidden node, because the hidden node is corresponding to one cell (or base station) but not one carrier.

Figure 7:
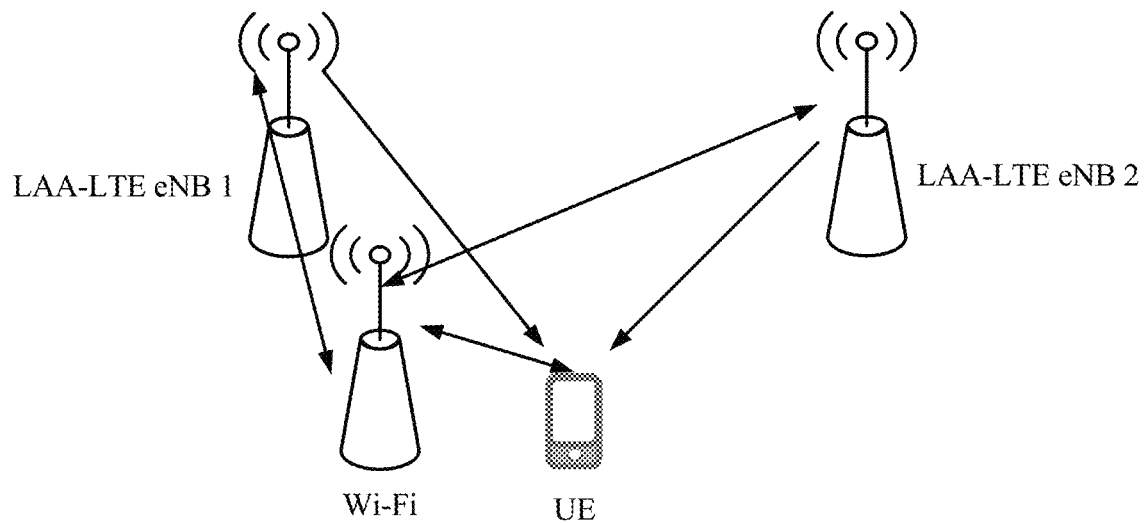
FIG. 7 is a schematic diagram 2 of a hidden node according to the present disclosure.

Referring to a schematic diagram 2 of a hidden node in FIG. 7, in FIG. 7, a solid line indicates that two nodes connected by the solid line can listen to and detect each other. Listening to and detecting each other herein means that the two nodes fall within a CCA range of each other. A dashed line indicates that two nodes connected by the dashed line cannot listen to or detect each other. The node may be UE, an LAA-LTE eNB, or a Wi-Fi AP. In FIG. 7, it is assumed that both an LAA-LTE eNB 1 and an LAA-LTE eNB 2 can operate on an unlicensed frequency band. Apparently, if the UE selects the LAA-LTE eNB 2 as the serving cell, the hidden node problem exists. However, if the UE selects the LAA-LTE eNB 1 as the serving cell, no hidden node exists. Therefore, it is insufficient to discover a possible hidden node only by performing RSSI measurement by the UE as instructed by the serving cell.

Figure 8:
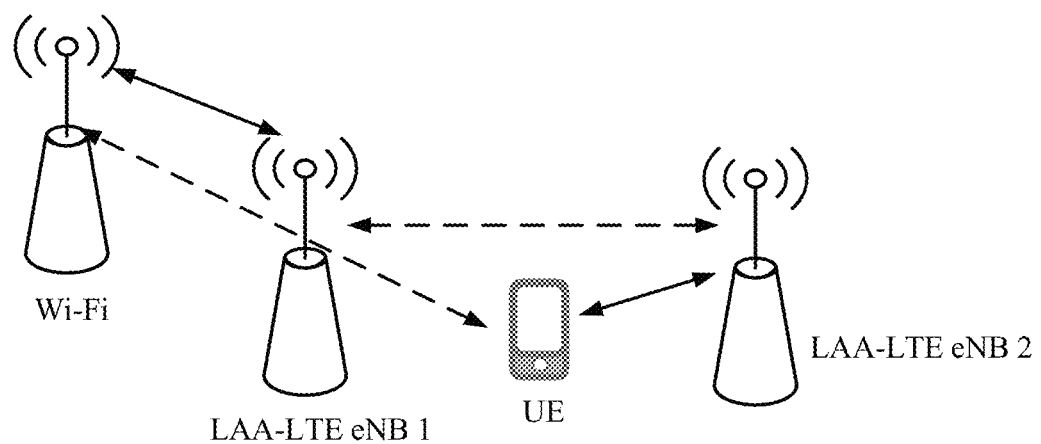
FIG. 8 is a schematic diagram 3 of a hidden node according to the present disclosure.

In conclusion, according to this embodiment of the present disclosure, the status of using the first target frequency band by the target cell may be learned; the measurement result of the wireless condition of the first target frequency band corresponding to the target cell may be obtained according to the first measurement mode, the second measurement mode, and/or the third measurement mode; and whether a hidden node exists is further determined. For example, an RRM measurement result related to interference energy is reported after each DMTC window. In this way, if the UE detects a DRS in the DMTC window, the UE measures a wireless condition of a first target frequency band corresponding to a target cell corresponding to identification information carried in the DRS. At a same moment, the target cell also obtains energy information by means of listening. Therefore, a listening result of the target cell in the DMTC window may be determined. Whether a hidden node exists is determined according to the listening result determined by the target cell at the same moment and the measurement result sent by the UE. That is, if there is a big difference between the two results, it indicates that a hidden node may exist. However, if the two results are close to each other, it does not indicate that no hidden node exists. As shown in a schematic diagram 3 of a hidden node in FIG. 8, if a hidden node exists near each of the target cell (for example, an LAA-LTE eNB 1) and the UE, and the two hidden nodes simultaneously send signals in one DMTC window, it cannot indicate that no hidden node exists even if a listening result of the target cell in the DMTC window is similar to a measurement result of the UE in the DMTC window. To avoid this case, whether a hidden node exists may be determined according to measurement results in a plurality of DMTC windows. The measurement results in the plurality of DMTC windows are selected, so that impact of simultaneously sending measurement results by the two hidden nodes in FIG. 8 can be reduced.

Herein, it should be noted that if the target cell is the serving cell of the UE, a target cell may directly compare the determined listening result with the measurement result sent by the UE, to determine whether a hidden node exists. If the target cell is not the serving cell of the UE, the UE first sends the measurement result to the serving cell, and then the serving cell obtains, by means of interaction, the listening result of the target cell in a corresponding measurement time set, and finally compares the obtained listening result with the measurement result sent by the UE. Alternatively, the serving cell may send the measurement result received from the UE to the target cell by means of interaction, so that the target cell completes comparison and then feeds back a comparison result to the serving cell; and finally, the serving cell determines, according to the comparison result, whether a hidden node exists.

According to the measurement method provided in this embodiment of the present disclosure, mobility can be managed for different target cells, and there is no need to additionally notify configuration information of the measurement time set. In addition, a hidden node can be predetermined. Particularly, a hidden node that may exist in the neighboring cell can be determined according to the DRS detected in the DMTC window, and as much information as possible is provided for serving cell selection. The status of using the first target frequency band by the target cell is determined in the DMTC window, so as to collect accurate statistics about interference energy measurement results of any detected cell in different time periods.

Figure 9A:
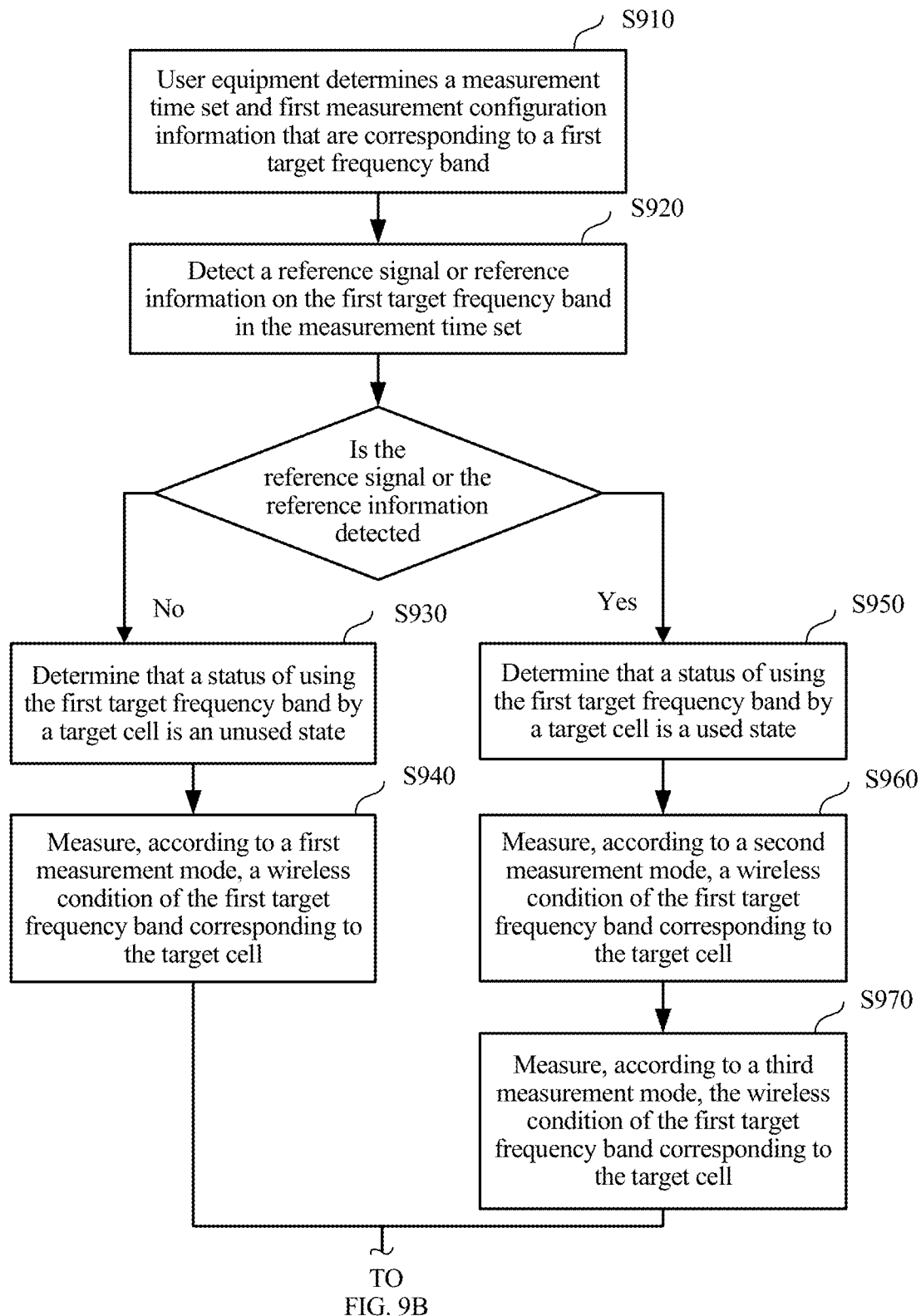
FIG. 9A and FIG. 9B are a flowchart of a measurement method according to Method Embodiment 2 of the present disclosure.
Figure 9B:
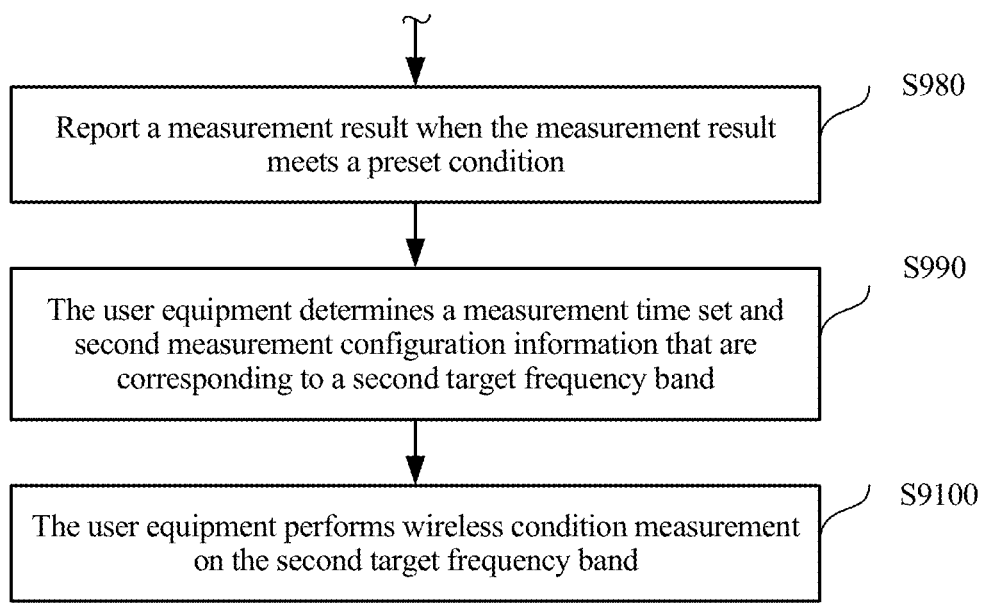

FIG. 9A and FIG. 9B are a flowchart of a measurement method according to Method Embodiment 2 of the present disclosure. The method may be executed by user equipment. As shown in FIG. 9A and FIG. 9B, the method may specifically include the following steps.

S910. The user equipment determines a measurement time set and first measurement configuration information that are corresponding to a first target frequency band, where the first measurement configuration information is configuring the user equipment to perform wireless condition measurement according to identification information of a target cell.

Optionally, the measurement time set is a discovery reference signal timing configuration DMTC.

S920. Detect a reference signal or reference information on the first target frequency band in the measurement time set, where the reference signal or the reference information carries the identification information of the target cell; and if the reference signal or the reference information is not detected, perform S930; or if the reference signal or the reference information is detected, perform S950.

Herein, the identification information of the target cell may be determined in one or more of the following manners:

(1) The user equipment may determine the identification information of the target cell according to identification information of a serving cell. In this case, the identification information of the target cell is the identification information of the serving cell.

(2) The user equipment may determine the identification information of the target cell according to first signaling. Herein, the first signaling may be used to indicate the identification information of the serving cell and/or identification information of a neighboring cell.

(3) The user equipment may determine the identification information of the target cell by means of blind detection. In this case, the user equipment may determine the identification information of the target cell by means of signal detection. The target cell includes the serving cell and/or the neighboring cell.

S930. Determine that a status of using the first target frequency band by the target cell is an unused state.

Optionally, the measurement time set may include a first preset time resource. The first preset time resource may include at least one of the following:

a time resource that is corresponding to a subframe in which a PSS/an SSS included in the reference signal is located; or a time resource between a start time of the measurement time set and a moment of the PSS/the SSS included in the reference signal.

When the measurement time set includes the first preset time resource, S930 may further include:

determining that the status of using the first target frequency band by the target cell on the first preset time resource is the unused state.

S940. Measure, according to a first measurement mode, a wireless condition of the first target frequency band corresponding to the target cell, where the first measurement mode is a mode of measuring energy of the first target frequency band.

When the measurement time set includes the first preset time resource, the measuring, according to a first measurement mode, a wireless condition of the first target frequency band corresponding to the target cell may further include:

determining, according to the first measurement mode, a measurement resource corresponding to the first measurement mode, where the measurement resource includes a time resource, and the time resource is in the first preset time resource; and measuring, according to the measurement resource corresponding to the first measurement mode, the wireless condition of the first target frequency band corresponding to the target cell.

When the measurement time set includes a second preset time resource, the measuring, according to a second measurement mode, a wireless condition of the first target frequency band corresponding to the target cell may further include:

determining, according to the second measurement mode, a measurement resource corresponding to the second measurement mode, where the measurement resource includes a time resource, and the time resource is in the second preset time resource; and measuring, according to the measurement resource corresponding to the second measurement mode, the wireless condition of the first target frequency band corresponding to the target cell.

When the measurement time set includes a third preset time resource, the measuring, according to a third measurement mode, a wireless condition of the first target frequency band corresponding to the target cell includes:

determining, according to the third measurement mode, a measurement resource corresponding to the third measurement mode, where the measurement resource includes a time resource, and the time resource is in the third preset time resource; and measuring, according to the measurement resource corresponding to the third measurement mode, the wireless condition of the first target frequency band corresponding to the target cell.

S950. Determine that a status of using the first target frequency band by the target cell is a used state.

Optionally, the measurement time set may further include a second preset time resource. The second preset time resource includes at least one of the following:

a time resource between a start time and an end time of sending the reference signal or the reference information on the first target frequency band; or a time resource between the start time of sending the reference signal or the reference information on the first target frequency band and an end time of the measurement time set.

When the measurement time set includes the second preset time resource, S950 may further include:

determining that the status of using the first target frequency band by the target cell on the second preset time resource is the used state.

Optionally, the measurement time set may further include a third preset time resource. The third preset time resource includes:

a time resource between a start time of the measurement time set and a start time of sending the reference signal or the reference information on the first target frequency band.

When the measurement time set includes the third preset time resource, the method in this embodiment of the present disclosure may further include:

determining that the status of using the first target frequency band by the target cell on the third preset time resource is a dormant state.

S960. Measure, according to a second measurement mode, a wireless condition of the first target frequency band corresponding to the target cell, where the second measurement mode is a mode of measuring the first target frequency band according to a signal of the target cell.

When the measurement time set includes the second preset time resource, the measuring, according to a second measurement mode, a wireless condition of the first target frequency band corresponding to the target cell may further include:

determining, according to the second measurement mode, a measurement resource corresponding to the second measurement mode, where the measurement resource includes a time resource, and the time resource is in the second preset time resource; and measuring, according to the measurement resource corresponding to the second measurement mode, the wireless condition of the first target frequency band corresponding to the target cell.

S970. Measure, according to a third measurement mode, the wireless condition of the first target frequency band corresponding to the target cell, where the third measurement mode is a mode of measuring energy of the first target frequency band.

When the measurement time set includes the third preset time resource, the measuring, according to a third measurement mode, the wireless condition of the first target frequency band corresponding to the target cell includes:

determining, according to the third measurement mode, a measurement resource corresponding to the third measurement mode, where the measurement resource includes a time resource, and the time resource is in the third preset time resource; and measuring, according to the measurement resource corresponding to the third measurement mode, the wireless condition of the first target frequency band corresponding to the target cell.

It should be noted that, in the example in this embodiment of the present disclosure, in a process of determining that the status of using the first target frequency band by the target cell is the used state, the wireless condition of the first target frequency band corresponding to the target cell is first measured according to the second measurement mode, and then the wireless condition of the first target frequency band corresponding to the target cell is measured according to the third measurement mode, that is, step S960 is performed before S970, but this is not limited in the present disclosure. A person skilled in the art may perform S970 before S960, or simultaneously perform S960 and S970. Details are not described herein.

S980. Report a measurement result when the measurement result meets a preset condition.

S990. The user equipment determines second measurement configuration information corresponding to a second target frequency band, where the second measurement configuration information is configuring the user equipment to perform wireless condition measurement not according to the identification information of the target cell.

S9100. The user equipment performs wireless condition measurement on the second target frequency band.

Herein, it should be noted that, in the example in this embodiment of the present disclosure, the measurement time set and the first measurement configuration information that are corresponding to the first target frequency band are determined first, and wireless condition measurement is performed, according to the identification information of the target cell, on the target frequency band corresponding to the target cell; and then the second measurement configuration information corresponding to the second target frequency band is determined, and wireless condition measurement is performed on the second target frequency band; that is, S910 to S980 are performed before S990 to S9100, but this is not limited in the present disclosure.

Alternatively, the user equipment may simultaneously determine the measurement time set and the first measurement configuration information that are corresponding to the first target frequency band and the second measurement configuration information corresponding to the second target frequency band, that is, simultaneously perform S990 to S9100 and S910 to S980. In conclusion, a sequence of performing S990 to S9100 and S910 to S980 is not strictly limited in the present disclosure.

According to the measurement method provided in this embodiment of the present disclosure, the user equipment determines the measurement time set and the first measurement configuration information that are corresponding to the first target frequency band, where the first measurement configuration information is configuring the user equipment to perform wireless condition measurement according to the identification information of the target cell; determines the status of using the first target frequency band by the target cell corresponding to the identification information; and measures, in the measurement time set according to the status of using the first target frequency band by the target cell, the wireless condition of the first target frequency band corresponding to the target cell, to obtain the measurement result. In this way, the user equipment can measure wireless conditions of different target frequency bands, so that mobility performance of the user equipment can be effectively improved.

Figure 10A:
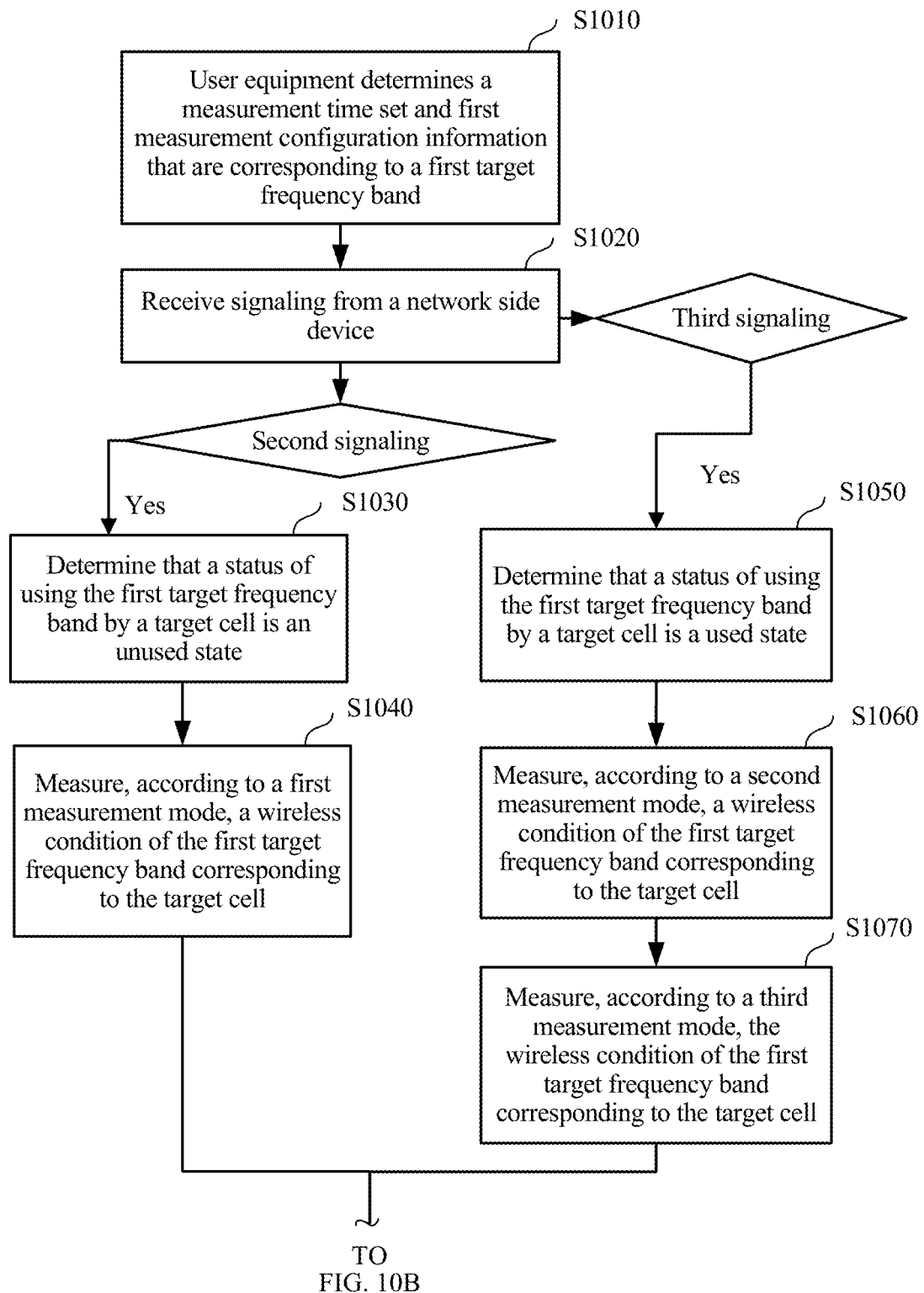
FIG. 10A and FIG. 10B are a flowchart of a measurement method according to Method Embodiment 3 of the present disclosure.
Figures 10B, 11:
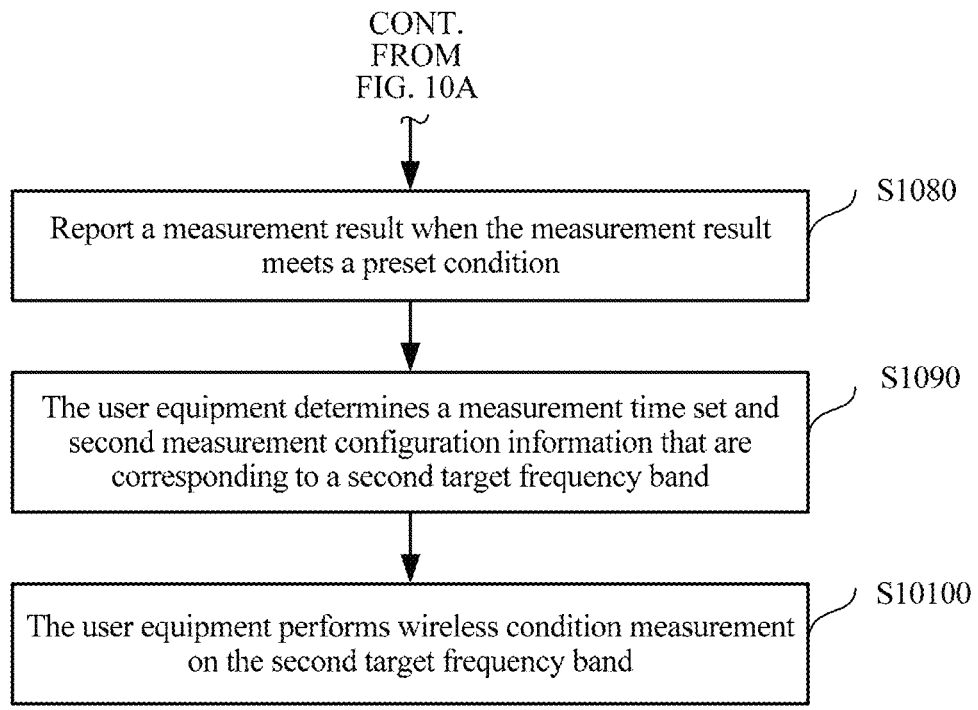
FIG. 11 is a flowchart of a measurement method according to Method Embodiment 4 of the present disclosure.

FIG. 10A and FIG. 10B are a flowchart of a measurement method according to Method Embodiment 3 of the present disclosure. The method may be executed by user equipment. As shown in FIG. 10A and FIG. 10B, the method may specifically include the following steps.

S1010. The user equipment determines a measurement time set and first measurement configuration information that are corresponding to a first target frequency band, where the first measurement configuration information is configuring the user equipment to perform wireless condition measurement according to identification information of a target cell.

Optionally, the measurement time set is a discovery reference signal timing configuration DMTC.

S1020. Receive signaling from a network side device; and when the received signaling is second signaling, perform S1030; or when the received signaling is third signaling, perform S1050.

Herein, the identification information of the target cell may be determined in one or more of the following manners:

(1) The user equipment may determine the identification information of the target cell according to identification information of a serving cell. In this case, the identification information of the target cell is the identification information of the serving cell.

(2) The user equipment may determine the identification information of the target cell according to first signaling. Herein, the first signaling may be used to indicate the identification information of the serving cell and/or identification information of a neighboring cell.

(3) The user equipment may determine the identification information of the target cell by means of blind detection. In this case, the user equipment may determine the identification information of the target cell by means of signal detection. The target cell includes the serving cell and/or the neighboring cell.

S1030. Determine that a status of using the first target frequency band by the target cell is an unused state.

S1040. Measure, according to a first measurement mode, a wireless condition of the first target frequency band corresponding to the target cell, where the first measurement mode is a mode of measuring energy of the first target frequency band.

The measuring, according to a first measurement mode, a wireless condition of the first target frequency band corresponding to the target cell may further include:

determining, according to the first measurement mode, a measurement resource corresponding to the first measurement mode, where the measurement resource includes a time resource, and the time resource is in the measurement time set; and measuring, according to the measurement resource corresponding to the first measurement mode, the wireless condition of the first target frequency band corresponding to the target cell.

Specifically, the time resource that is included in the measurement resource corresponding to the first measurement mode may be in a fifth preset time resource of the measurement time set. A main characteristic of the fifth preset time resource is that the status of using the first target frequency band by the target cell on the fifth preset time resource is the unused state.

S1050. Determine that a status of using the first target frequency band by the target cell is a used state.

S1060. Measure, according to a second measurement mode, a wireless condition of the first target frequency band corresponding to the target cell, where the second measurement mode is a mode of measuring the first target frequency band according to a signal of the target cell.

The measuring, according to a second measurement mode, a wireless condition of the first target frequency band corresponding to the target cell may further include:

determining, according to the second measurement mode, a measurement resource corresponding to the second measurement mode, where the measurement resource includes a time resource, and the time resource is in the measurement time set; and measuring, according to the measurement resource corresponding to the second measurement mode, the wireless condition of the first target frequency band corresponding to the target cell.

Specifically, the time resource that is included in the measurement resource corresponding to the second measurement mode may be in a sixth preset time resource of the measurement time set. A main characteristic of the sixth preset time resource is that the status of using the first target frequency band by the target cell on the sixth preset time resource is the used state.

S1070. Measure, according to a third measurement mode, the wireless condition of the first target frequency band corresponding to the target cell, where the third measurement mode is a mode of measuring energy of the first target frequency band.

The measuring, according to a third measurement mode, the wireless condition of the first target frequency band corresponding to the target cell includes:

determining, according to the third measurement mode, a measurement resource corresponding to the third measurement mode, where the measurement resource includes a time resource, and the time resource is in the measurement time set; and measuring, according to the measurement resource corresponding to the third measurement mode, the wireless condition of the first target frequency band corresponding to the target cell.

Specifically, the time resource that is included in the measurement resource corresponding to the third measurement mode may be in a seventh preset time resource of the measurement time set. A main characteristic of the seventh preset time resource is that the status of using the first target frequency band by the target cell on the seventh preset time resource is a dormant state.

It should be noted that, in the example in this embodiment of the present disclosure, in a process of determining that the status of using the first target frequency band by the target cell is the used state, the wireless condition of the first target frequency band corresponding to the target cell is first measured according to the second measurement mode, and then the wireless condition of the first target frequency band corresponding to the target cell is measured according to the third measurement mode, that is, step S1060 is performed before S1070, but this is not limited in the present disclosure. A person skilled in the art may perform S1070 before S1060, or simultaneously perform S1070 and S1060. Details are not described herein.

S1080. Report the measurement result when the measurement result meets a preset condition.

S1090. The user equipment determines second measurement configuration information corresponding to a second target frequency band, where the second measurement configuration information is configuring the user equipment to perform wireless condition measurement not according to the identification information of the target cell.

S10100. The user equipment performs wireless condition measurement on the second target frequency band.

Herein, it should be noted that, in the example in this embodiment of the present disclosure, the measurement time set and the first measurement configuration information that are corresponding to the first target frequency band are determined first, and wireless condition measurement is performed, according to the identification information of the target cell, on the target frequency band corresponding to the target cell; and then the second measurement configuration information corresponding to the second target frequency band is determined, and wireless condition measurement is performed on the second target frequency band; that is, S1010 to S1080 are performed before S1090 to S10100, but this is not limited in the present disclosure. Alternatively, the user equipment may simultaneously determine the measurement time set and the first measurement configuration information that are corresponding to the first target frequency band and the second measurement configuration information corresponding to the second target frequency band, that is, simultaneously perform S1090 to S10100 and S1010 to S1080. In conclusion, a sequence of performing S1090 to S10100 and S1010 to S1080 is not strictly limited in the present disclosure.

According to the measurement method provided in this embodiment of the present disclosure, the user equipment determines the measurement time set and the first measurement configuration information that are corresponding to the first target frequency band, where the first measurement configuration information is configuring the user equipment to perform wireless condition measurement according to the identification information of the target cell; determines the status of using the first target frequency band by the target cell corresponding to the identification information; and measures, in the measurement time set according to the status of using the first target frequency band by the target cell, the wireless condition of the first target frequency band corresponding to the target cell, to obtain the measurement result. In this way, the user equipment can measure wireless conditions of different target frequency bands, so that mobility performance of the user equipment can be effectively improved.

FIG. 11 is a flowchart of a measurement method according to Method Embodiment 4 of the present disclosure. The method may be executed by a network side device. As shown in FIG. 11, the method may specifically include:

S1110. The network side device sends a measurement time set and first measurement configuration information that are corresponding to a first target frequency band to user equipment, where the first measurement configuration information is configuring the user equipment to perform wireless condition measurement according to identification information of a target cell, so that the user equipment determines a status of using the first target frequency band by the target cell corresponding to the identification information, and the user equipment measures, in the measurement time set according to the status of using the first target frequency band by the target cell, a wireless condition of the first target frequency band corresponding to the target cell, to obtain a measurement result.

Herein, the network side device may be a device capable of providing a service of data for the user equipment. The data includes data carried on a service data channel and/or data carried on a control data channel. The network side device may be alternatively a device capable of providing measurement configuration information for the user equipment. The measurement configuration information includes at least the measurement time set and/or the first measurement configuration information, and subsequently mentioned second measurement configuration information in this specification. In descriptions of this specification, the network side device is an LTE eNodeB. Specifically, the network side device may periodically or aperiodically configure the measurement time set and the first measurement configuration information.

Particularly, in an LTE system, the measurement time set may be obtained by means of discovery reference signal measurement timing configuration (DMTC). That is, the measurement time set is a DMTC window. Certainly, in actual application, the measurement time set may be alternatively configured in another manner. This is not limited in the present disclosure.

In addition, definitions of the first target frequency band, the measurement time set, and the first measurement configuration information and steps of determining, by the user equipment, the status of using the first target frequency band by the target cell and measuring the wireless condition of the first target frequency band corresponding to the target cell are the same as the descriptions in steps S110 to S130 in Embodiment 1. Details are not described herein again.

Optionally, Embodiment 4 of the present disclosure may further include the following steps:
  receiving the measurement result sent by the user equipment; and
  performing radio resource management on the user equipment according to the received measurement result.

The performing radio resource management on the user equipment according to the received measurement result is specifically:
  determining, according to the received measurement result, whether the user equipment needs to change a frequency band for receiving data; and/or
  determining, according to the received measurement result, whether the user equipment needs to change a serving cell.

It should be noted that, after obtaining the measurement result, the user equipment may send the measurement result to the network side device when determining that the measurement result meets a preset condition. That is, the network side device receives the measurement result sent by the user equipment. Herein, for a definition of the preset condition, refer to the description in Embodiment 1 of the present disclosure. After receiving the measurement result sent by the user equipment, the network side device can manage mobility of the user equipment, for example, determine whether the user equipment needs to change the frequency band for receiving data or determine whether the user equipment needs to change the serving cell.

In addition, after receiving the measurement result sent by the user equipment, the network side device may further determine, according to the received measurement result, whether a hidden node exists for the user equipment and the target cell.

The step of determining whether a hidden node exists for the user equipment and the target cell is specifically:
  obtaining a measurement result of the wireless condition of the first target frequency band corresponding to the target cell; and
  determining, according to the received measurement result and the measurement result of the wireless condition of the first target frequency band corresponding to the target cell, whether a hidden node exists for the user equipment and the target cell.

In the following example, whether a hidden node exists for the user equipment and the target cell is determined according to the received measurement result.

Herein, when the network side device is the serving cell, when receiving the measurement result sent by the user equipment, the network side device may directly determine whether the measurement result is obtained by means of measurement according to a second measurement mode. When determining that the measurement result is obtained by means of measurement according to the second measurement mode, the network side device may compare a listening result of the network side device in a corresponding measurement time set with the measurement result sent by the UE, to determine whether a hidden node exists. If there is a big difference between the two results, it indicates that a hidden node may exist. However, if the two results are close to each other, it does not indicate that no hidden node exists, and further determining is required.

In addition, the network side device may further compare the measurement result sent by the user equipment with a specific energy threshold. The specific energy threshold may be, for example, an energy threshold used by the serving cell to determine, when performing CCA, whether the target frequency band is occupied by another cell. If the measurement result sent by the user equipment is greater than the specific energy threshold, and the serving cell determines that the target frequency band can be occupied in the measurement time set, it indicates that an energy threshold detected by the serving cell in the measurement time set is less than a CCA threshold. Therefore, the network side device may determine, according to a result of comparison between the measurement result sent by the user equipment and the specific energy threshold, whether a hidden node exists on the target frequency band for the user equipment and the serving cell.

It should be noted that, when the network side device is a cell (for example, a neighboring cell) other than the serving cell, when receiving the measurement result sent by the user equipment, the network side device first determines whether the measurement result is obtained by means of measurement according to a second measurement mode; and when determining that the measurement result is obtained by means of measurement according to the second measurement mode, sends a listening result of the network side device in a corresponding measurement time set to the serving cell by interacting with the serving cell. Finally, the serving cell compares the listening result of the network side device with the measurement result sent by the UE, to determine whether a hidden node exists. Alternatively, the serving cell may send the measurement result received from the UE to the network side device by means of interaction, so that the network side device completes comparison and then feeds back a comparison result to the serving cell; and finally, the serving cell determines, according to the comparison result, whether a hidden node exists.

It may be understood that when there are a plurality of target cells, the network side device may determine, according to the foregoing method, whether a hidden node exists for the user equipment and each target cell.

Optionally, the method may further include a step of sending first signaling to the user equipment, where the first signaling is used to indicate that the identification information of the target cell is identification information of a neighboring cell. After receiving the first signaling, the user equipment may determine the target cell as the neighboring cell; determine the status of using the first target frequency band by the neighboring cell; and measure, in the measurement time set according to the status of using the first target frequency band by the neighboring cell, the wireless condition of the first target frequency band corresponding to the neighboring cell, to obtain the measurement result. For the determining the status of using the first target frequency band by the neighboring cell and measuring the wireless condition of the first target frequency band corresponding to the neighboring cell, refer to the description in Embodiment 1 of the present disclosure. Details are not described herein again.

Optionally, the method may further include a step of sending second signaling to the user equipment, where the second signaling is used to indicate that the status of using the first target frequency band by the target cell in the measurement time set is an unused state. After receiving the second signaling, the user equipment may determine the status of using the first target frequency band by the target cell, and measure, according to the determined using status, the wireless condition of the first target frequency band corresponding to the target cell, to obtain the measurement result.

Optionally, the method may further include a step of sending third signaling to the user equipment, where the third signaling is used to indicate that the status of using the first target frequency band by the target cell in the measurement time set is a used state. After receiving the third signaling, the user equipment may determine the status of using the first target frequency band by the target cell, and measure, according to the determined using status, the wireless condition of the first target frequency band corresponding to the target cell, to obtain the measurement result.

Optionally, Embodiment 4 of the present disclosure may further include:

sending second measurement configuration information corresponding to a second target frequency band to the user equipment, where the second measurement configuration information is configuring the user equipment to perform wireless condition measurement not according to the identification information of the target cell, so that the user equipment performs wireless condition measurement on the second target frequency band.

The performing, by the user equipment, wireless condition measurement on the second target frequency band is performing wireless condition measurement on a frequency resource of the second target frequency band not for the target cell.

In conclusion, according to the measurement method provided in Embodiment 4 of the present disclosure, mobility can be managed for different target cells, and there is no need to additionally notify configuration information of the measurement time set. In addition, a hidden node can be predetermined. Particularly, a hidden node that may exist in the neighboring cell can be determined according to a DRS detected in a DMTC window, and as much information as possible is provided for serving cell selection. The status of using the first target frequency band by the target cell is determined in the DMTC window, so as to collect accurate statistics about interference energy measurement results of any detected cell in different time periods.

Apparatus Embodiments

Figure 12:
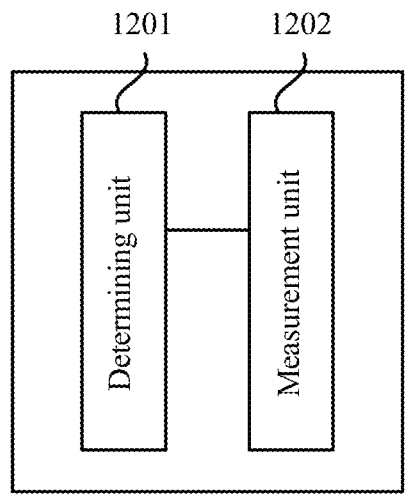
FIG. 12 is a schematic diagram of a base station according to Apparatus Embodiment 1 of the present disclosure.

FIG. 12 is a schematic diagram of user equipment according to Apparatus Embodiment 1 of the present disclosure. The user equipment may be configured to execute the method shown in FIG. 1. In FIG. 12, the user equipment includes a determining unit 1201 and a measurement unit 1202.

The determining unit 1201 is configured to determine a measurement time set and first measurement configuration information that are corresponding to a first target frequency band, where the first measurement configuration information is configuring the user equipment to perform wireless condition measurement according to identification information of a target cell.

Optionally, the measurement time set is a discovery reference signal timing configuration DMTC.

The determining unit 1201 is further configured to determine a status of using the first target frequency band by the target cell corresponding to the identification information.

The measurement unit 1202 is configured to measure, in the measurement time set according to the status that is of using the first target frequency band by the target cell and that is determined by the determining unit 1201, a wireless condition of the first target frequency band corresponding to the target cell, to obtain a measurement result.

Herein, the identification information of the target cell may be determined in one or more of the following manners:

(1) The user equipment may determine the identification information of the target cell according to identification information of a serving cell. In this case, the identification information of the target cell is the identification information of the serving cell.

(2) The user equipment may determine the identification information of the target cell according to first signaling. Herein, the first signaling may be used to indicate the identification information of the serving cell and/or identification information of a neighboring cell.

(3) The user equipment may determine the identification information of the target cell by means of blind detection. In this case, the user equipment may determine the identification information of the target cell by means of signal detection. The target cell includes the serving cell and/or the neighboring cell.

The measurement unit 1202 is specifically configured to: when it is determined that the status of using the first target frequency band by the target cell is an unused state, measure, according to a first measurement mode, the wireless condition of the first target frequency band corresponding to the target cell, where the first measurement mode is a mode of measuring energy of the first target frequency band.

Optionally, the determining that the status of using the first target frequency band by the target cell is an unused state includes:

receiving second signaling, and determining, according to the second signaling, that the status of using the first target frequency band by the target cell in the measurement time set is the unused state.

Optionally, the determining that the status of using the first target frequency band by the target cell is an unused state includes:
  detecting a reference signal or reference information on the first target frequency band in the measurement time set, where the reference signal or the reference information carries the identification information of the target cell; and
  if the reference signal or the reference information is not detected, determining that the status of using the first target frequency band by the target cell is the unused state.

Optionally, the measurement time set includes a first preset time resource. The first preset time resource includes at least one of the following:
  a time resource that is corresponding to a subframe in which a primary synchronization signal PSS/a secondary synchronization signal SSS included in the reference signal is located; or
  a time resource between a start time of the measurement time set and a moment of the primary synchronization signal PSS/the secondary synchronization signal SSS included in the reference signal.

The measuring, according to a first measurement mode, the wireless condition of the first target frequency band corresponding to the target cell includes:
  determining, according to the first measurement mode, a measurement resource corresponding to the first measurement mode, where the measurement resource includes a time resource, and the time resource is in the first preset time resource; and
  measuring, according to the measurement resource corresponding to the first measurement mode, the wireless condition of the first target frequency band corresponding to the target cell.

The determining that the status of using the first target frequency band by the target cell is an unused state includes:
  determining that the status of using the first target frequency band by the target cell on the first preset time resource is the unused state. Optionally, the measurement unit 1202 is further specifically configured to:
  when it is determined that the status of using the first target frequency band by the target cell is a used state, measure, according to a second measurement mode, the wireless condition of the first target frequency band corresponding to the target cell, where the second measurement mode is a mode of measuring the first target frequency band according to a signal of the target cell.

Optionally, the measurement unit 1202 is further specifically configured to:
  when it is determined that the status of using the first target frequency band by the target cell is a used state, measure, according to a third measurement mode, the wireless condition of the first target frequency band corresponding to the target cell, where the third measurement mode is a mode of measuring energy of the first target frequency band.

Optionally, the determining that the status of using the first target frequency band by the target cell is a used state includes:
  detecting a reference signal or reference information on the first target frequency band in the measurement time set, where the reference signal or the reference information carries the identification information of the target cell; and
  if the reference signal or the reference information is detected, determining that the status of using the first target frequency band by the target cell is the used state.

Optionally, the determining that the status of using the first target frequency band by the target cell is a used state includes:
  receiving third signaling, and determining, according to the third signaling, that the status of using the first target frequency band by the target cell in the measurement time set is the used state.

Optionally, the measurement time set includes a second preset time resource. The second preset time resource includes at least one of the following:
  a time resource between a start time and an end time of sending the reference signal or the reference information on the first target frequency band; or
  a time resource between the start time of sending the reference signal or the reference information on the first target frequency band and an end time of the measurement time set.

The measuring, according to a second measurement mode, the wireless condition of the first target frequency band corresponding to the target cell includes:
  determining, according to the second measurement mode, a measurement resource corresponding to the second measurement mode, where the measurement resource includes a time resource, and the time resource is in the second preset time resource; and
  measuring, according to the measurement resource corresponding to the second measurement mode, the wireless condition of the first target frequency band corresponding to the target cell.

The determining that the status of using the first target frequency band by the target cell is a used state includes:
  determining that the status of using the first target frequency band by the target cell on the second preset time resource is the used state.

Optionally, the measurement time set includes a third preset time resource. The third preset time resource includes:
  a time resource between a start time of the measurement time set and a start time of sending the reference signal or the reference information on the first target frequency band.

The measuring, according to a third measurement mode, the wireless condition of the first target frequency band corresponding to the target cell includes:
  determining, according to the third measurement mode, a measurement resource corresponding to the third measurement mode, where the measurement resource includes a time resource, and the time resource is in the third preset time resource; and
  measuring, according to the measurement resource corresponding to the third measurement mode, the wireless condition of the first target frequency band corresponding to the target cell.

Optionally, the determining unit 1201 is further configured to determine that the status of using the first target frequency band by the target cell on the third preset time resource is a dormant state.

Optionally, the user equipment further includes a reporting unit 1203, configured to report the measurement result when the measurement result meets a preset condition.

Optionally, the determining unit 1201 is further configured to determine second measurement configuration information corresponding to a second target frequency band, where the second measurement configuration information is configuring the user equipment to perform wireless condition measurement not according to the identification information of the target cell.

The measurement unit 1202 is further configured to perform wireless condition measurement on the second target frequency band.

Functions of functional modules of the apparatus in this embodiment of the present disclosure may be implemented by performing the steps in the foregoing method embodiments. Therefore, a specific working process of the apparatus provided in this application is not described herein again.

According to the user equipment provided in this embodiment of the present disclosure, the determining unit 1201 determines the measurement time set and the first measurement configuration information that are corresponding to the first target frequency band, where the first measurement configuration information is configuring the user equipment to perform wireless condition measurement according to the identification information of the target cell. The determining unit 1201 determines the status of using the first target frequency band by the target cell corresponding to the identification information. The measurement unit 1202 measures, in the measurement time set according to the status of using the first target frequency band by the target cell, the wireless condition of the first target frequency band corresponding to the target cell, to obtain the measurement result. In this way, the user equipment can measure wireless conditions of different target frequency bands, so that mobility performance of the user equipment can be effectively improved.

Figure 13:
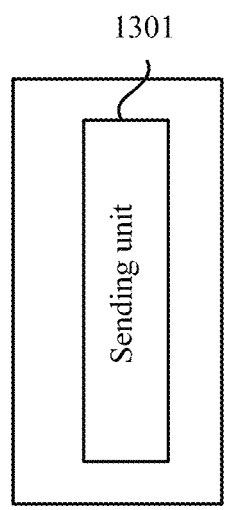
FIG. 13 is a schematic diagram of a base station according to Apparatus Embodiment 2 of the present disclosure.

FIG. 13 is a schematic diagram of a network side device according to Apparatus Embodiment 2 of the present disclosure. The network side device may be configured to execute the method shown in FIG. 11. In FIG. 13, the network side device includes a sending unit 1301.

The sending unit 1301 is configured to send a measurement time set and first measurement configuration information that are corresponding to a first target frequency band to user equipment, where the first measurement configuration information is configuring the user equipment to perform wireless condition measurement according to identification information of a target cell, so that the user equipment determines a status of using the first target frequency band by the target cell corresponding to the identification information, and the user equipment measures, in the measurement time set according to the status of using the first target frequency band by the target cell, a wireless condition of the first target frequency band corresponding to the target cell, to obtain a measurement result.

Optionally, the network side device may further include a receiving unit 1302 and a management unit 1303.

The receiving unit 1302 is configured to receive the measurement result sent by the user equipment.

The management unit 1303 is configured to perform radio resource management on the user equipment according to the measurement result received by the receiving unit 1302.

Optionally, the sending unit 1301 is further configured to send first signaling to the user equipment, where the first signaling is used to indicate that the identification information of the target cell is identification information of a neighboring cell.

Optionally, the sending unit 1301 is further configured to send second signaling to the user equipment, where the second signaling is used to indicate that the status of using the first target frequency band by the target cell in the measurement time set is an unused state.

Optionally, the sending unit 1301 is further configured to send third signaling to the user equipment, where the third signaling is used to indicate that the status of using the first target frequency band by the target cell in the measurement time set is a used state.

Optionally, the sending unit 1301 is further configured to send second measurement configuration information corresponding to a second target frequency band to the user equipment, where the second measurement configuration information is configuring the user equipment to perform wireless condition measurement not according to the identification information of the target cell, so that the user equipment performs wireless condition measurement on the second target frequency band.

Functions of functional modules of the apparatus in this embodiment of the present disclosure may be implemented by performing the steps in the foregoing method embodiments. Therefore, a specific working process of the apparatus provided in this application is not described herein again.

According to the network side device provided in this embodiment of the present disclosure, the sending unit 1301 sends the measurement time set and the first measurement configuration information that are corresponding to the first target frequency band to the user equipment, where the first measurement configuration information is configuring the user equipment to perform wireless condition measurement according to the identification information of the target cell, so that the user equipment determines the status of using the first target frequency band by the target cell corresponding to the identification information, and the user equipment measures, in the measurement time set according to the status of using the first target frequency band by the target cell, the wireless condition of the first target frequency band corresponding to the target cell, to obtain the measurement result. In this way, the user equipment can measure wireless conditions of different target frequency bands, so that mobility performance of the user equipment can be effectively improved.

Figure 14:
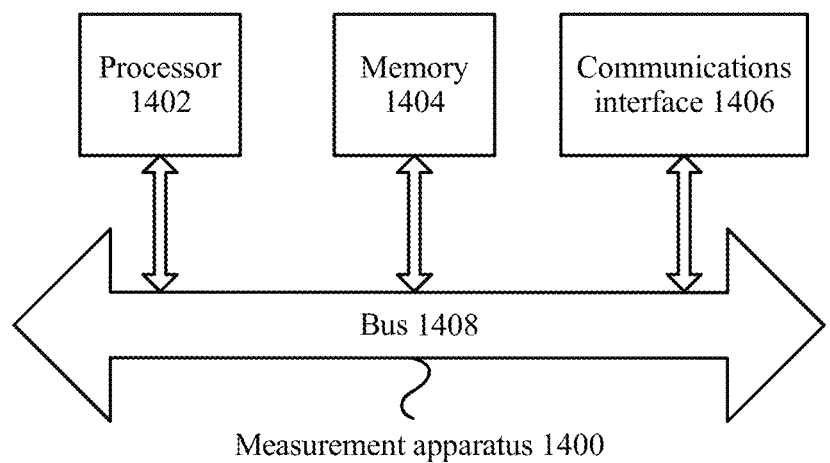
FIG. 14 is a schematic diagram of a measurement apparatus according to Apparatus Embodiment 3 of the present disclosure.

FIG. 14 is a schematic diagram of a measurement apparatus according to Apparatus Embodiment 3 of the present disclosure. As shown in FIG. 14, the measurement apparatus 1400 includes a processor 1402, a memory 1404, a communications interface 1406, and a bus 1408. The processor 1402, the memory 1404, and the communications interface 1406 are communicatively connected to each other by using the bus 1408.

The processor 1402 may be a general-purpose central processing unit (CPU), a microprocessor, an application-specific integrated circuit (ASIC), or one or more integrated circuits, and is configured to execute a related program to implement the technical solutions provided in Method Embodiments 1 to 3 of the present disclosure.

The memory 1404 may be a read-only memory (ROM), a static storage device, a dynamic storage device, or a random access memory (RAM). The memory 1404 may store an operating system and another application. When the technical solutions provided in the embodiments of the present disclosure are implemented by using software or firmware, program code used to implement any one of the optional technical solutions provided in Method Embodiments 1 to 3 of the present disclosure is stored in the memory 1404 and executed by the processor 1402.

The communications interface 1406 is configured to communicate with another switch or control server.

The bus 1408 may include a channel, configured to transmit information between parts (for example, the processor 1402, the memory 1404, and the communications interface 1406) of the measurement apparatus 1400.

When the measurement apparatus 1400 runs, the processor 1402 accesses the program code in the memory 1404 to execute the following instructions:

determining a measurement time set and first measurement configuration information that are corresponding to a first target frequency band, where the first measurement configuration information is configuring the user equipment to perform wireless condition measurement according to identification information of a target cell; where the measurement time set is a discovery reference signal timing configuration DMTC;

determining a status of using the first target frequency band by the target cell corresponding to the identification information; and measuring, in the measurement time set according to the status of using the first target frequency band by the target cell, a wireless condition of the first target frequency band corresponding to the target cell, to obtain a measurement result.

Herein, the identification information of the target cell may be determined in one or more of the following manners:

(1) The user equipment may determine the identification information of the target cell according to identification information of a serving cell. In this case, the identification information of the target cell is the identification information of the serving cell.

(2) The user equipment may determine the identification information of the target cell according to first signaling. Herein, the first signaling may be used to indicate the identification information of the serving cell and/or identification information of a neighboring cell.

(3) The user equipment may determine the identification information of the target cell by means of blind detection. In this case, the user equipment may determine the identification information of the target cell by means of signal detection. The target cell includes the serving cell and/or the neighboring cell.

Further, the processor 1402 is configured to execute an instruction for the following process:

when determining that the status of using the first target frequency band by the target cell is an unused state, measuring, according to a first measurement mode, the wireless condition of the first target frequency band corresponding to the target cell, where the first measurement mode is a mode of measuring energy of the first target frequency band.

Further, the processor 1402 is configured to execute an instruction for the following process:

receiving second signaling, and determining, according to the second signaling, that the status of using the first target frequency band by the target cell in the measurement time set is the unused state.

Further, the processor 1402 is configured to execute an instruction for the following process:

detecting a reference signal or reference information on the first target frequency band in the measurement time set, where the reference signal or the reference information carries the identification information of the target cell; and if the reference signal or the reference information is not detected, determining that the status of using the first target frequency band by the target cell is the unused state.

The measurement time set includes a first preset time resource. The first preset time resource includes at least one of the following:

a time resource that is corresponding to a subframe in which a primary synchronization signal PSS/a secondary synchronization signal SSS included in the reference signal is located; or a time resource between a start time of the measurement time set and a moment of the primary synchronization signal PSS/the secondary synchronization signal SSS included in the reference signal.

Further, the processor 1402 is configured to execute an instruction for the following process:

determining, according to the first measurement mode, a measurement resource corresponding to the first measurement mode, where the measurement resource includes a time resource, and the time resource is in the first preset time resource; and measuring, according to the measurement resource corresponding to the first measurement mode, the wireless condition of the first target frequency band corresponding to the target cell.

Further, the processor 1402 is configured to execute an instruction for the following process:

determining that the status of using the first target frequency band by the target cell on the first preset time resource is the unused state.

Further, the processor 1402 is configured to execute an instruction for the following process:

when determining that the status of using the first target frequency band by the target cell is a used state, measuring, according to a second measurement mode, the wireless condition of the first target frequency band corresponding to the target cell, where the second measurement mode is a mode of measuring the first target frequency band according to a signal of the target cell.

Further, the processor 1402 is configured to execute an instruction for the following process:

when determining that the status of using the first target frequency band by the target cell is a used state, measuring, according to a third measurement mode, the wireless condition of the first target frequency band corresponding to the target cell, where the third measurement mode is a mode of measuring energy of the first target frequency band.

Further, the processor 1402 is configured to execute an instruction for the following process:

detecting a reference signal or reference information on the first target frequency band in the measurement time set, where the reference signal or the reference information carries the identification information of the target cell; and if the reference signal or the reference information is detected, determining that the status of using the first target frequency band by the target cell is the used state.

Further, the processor 1402 is configured to execute an instruction for the following process:

receiving third signaling, and determining, according to the third signaling, that the status of using the first target frequency band by the target cell in the measurement time set is the used state.

Optionally, the measurement time set includes a second preset time resource. The second preset time resource includes at least one of the following:

a time resource between a start time and an end time of sending the reference signal or the reference information on the first target frequency band; or a time resource between the start time of sending the reference signal or the reference information on the first target frequency band and an end time of the measurement time set.

Further, the processor 1402 is configured to execute an instruction for the following process:

determining, according to the second measurement mode, a measurement resource corresponding to the second measurement mode, where the measurement resource includes a time resource, and the time resource is in the second preset time resource; and measuring, according to the measurement resource corresponding to the second measurement mode, the wireless condition of the first target frequency band corresponding to the target cell.

Further, the processor 1402 is configured to execute an instruction for the following process:

determining that the status of using the first target frequency band by the target cell on the second preset time resource is the used state.

Optionally, the measurement time set includes a third preset time resource. The third preset time resource includes:

a time resource between a start time of the measurement time set and a start time of sending the reference signal or the reference information on the first target frequency band.

Further, the processor 1402 is configured to execute an instruction for the following process:

determining, according to the third measurement mode, a measurement resource corresponding to the third measurement mode, where the measurement resource includes a time resource, and the time resource is in the third preset time resource; and measuring, according to the measurement resource corresponding to the third measurement mode, the wireless condition of the first target frequency band corresponding to the target cell.

Further, the processor 1402 is configured to execute an instruction for the following process:

determining that the status of using the first target frequency band by the target cell on the third preset time resource is a dormant state.

Further, the processor 1402 is configured to execute an instruction for the following process:

reporting the measurement result when the measurement result meets a preset condition.

Further, the processor 1402 is configured to execute an instruction for the following process:

determining second measurement configuration information corresponding to a second target frequency band, where the second measurement configuration information is configuring the user equipment to perform wireless condition measurement not according to the identification information of the target cell; and performing wireless condition measurement on the second target frequency band.

According to the measurement apparatus provided in this embodiment of the present disclosure, the user equipment can measure wireless conditions of different target frequency band, so that mobility performance of the user equipment can be effectively improved.

Figure 15:
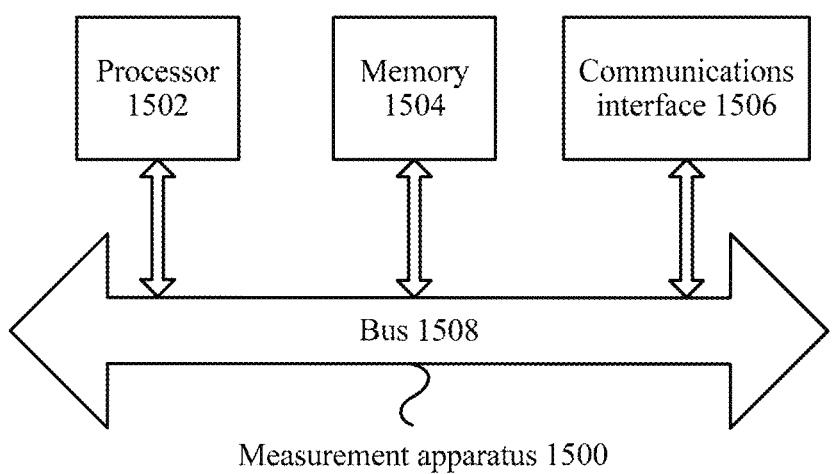
FIG. 15 is a schematic diagram of a measurement apparatus according to Apparatus Embodiment 4 of the present disclosure.

FIG. 15 is a schematic diagram of a measurement apparatus according to Apparatus Embodiment 4 of the present disclosure. As shown in FIG. 15, the measurement apparatus 1500 includes a processor 1502, a memory 1504, a communications interface 1506, and a bus 1508. The processor 1502, the memory 1504, and the communications interface 1506 are communicatively connected to each other by using the bus 1508.

The processor 1502 may be a general-purpose central processing unit (CPU), a microprocessor, an application-specific integrated circuit (ASIC), or one or more integrated circuits, and is configured to execute a related program to implement the technical solution provided in Method Embodiment 4 of the present disclosure.

The memory 1504 may be a read-only memory (ROM), a static storage device, a dynamic storage device, or a random access memory (RAM). The memory 1504 may store an operating system and another application. When the technical solutions provided in the embodiments of the present disclosure are implemented by using software or firmware, program code used to implement the technical solution provided in Method Embodiment 4 of the present disclosure is stored in the memory 1504 and executed by the processor 1502.

The communications interface 1506 is configured to communicate with another switch or control server.

The bus 1508 may include a channel, configured to transmit information between parts (for example, the processor 1502, the memory 1504, and the communications interface 1506) of the measurement apparatus 1500.

When the measurement apparatus 1500 runs, the processor 1502 accesses the program code in the memory 1504 to execute the following instructions:

sending a measurement time set and first measurement configuration information that are corresponding to a first target frequency band to user equipment, where the first measurement configuration information is configuring the user equipment to perform wireless condition measurement according to identification information of a target cell, so that the user equipment determines a status of using the first target frequency band by the target cell corresponding to the identification information, and the user equipment measures, in the measurement time set according to the status of using the first target frequency band by the target cell, a wireless condition of the first target frequency band corresponding to the target cell, to obtain a measurement result.

Further, the processor 1502 is configured to execute an instruction for the following process:

receiving the measurement result sent by the user equipment; and performing radio resource management on the user equipment according to the received measurement result.

Further, the processor 1502 is configured to execute an instruction for the following process:

sending first signaling to the user equipment, where the first signaling is used to indicate that the identification information of the target cell is identification information of a neighboring cell.

Further, the processor 1502 is configured to execute an instruction for the following process:

sending second signaling to the user equipment, where the second signaling is used to indicate that the status of using the first target frequency band by the target cell in the measurement time set is an unused state.

Further, the processor 1502 is configured to execute an instruction for the following process:

sending third signaling to the user equipment, where the third signaling is used to indicate that the status of using the first target frequency band by the target cell in the measurement time set is a used state.

Further, the processor 1502 is configured to execute an instruction for the following process:

sending second measurement configuration information corresponding to a second target frequency band to the user equipment, where the second measurement configuration information is configuring the user equipment to perform wireless condition measurement not according to the identification information of the target cell, so that the user equipment performs wireless condition measurement on the second target frequency band.

According to the measurement apparatus provided in this embodiment of the present disclosure, the user equipment can measure wireless conditions of different target frequency band, so that mobility performance of the user equipment can be effectively improved.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present disclosure are further described in detail. It should be understood that the foregoing descriptions are merely specific implementations of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A measurement method, comprising:
    determining, by a user equipment, a measurement time set corresponding to a first target frequency band and first measurement configuration information corresponding to the first target frequency band, wherein the first measurement configuration information indicates that wireless condition measurement is to be perfirned according to identification information of a target cell, wherein the target cell comprises a serving cell or a neighboring cell;
    determining a status of using the first target frequency band by the target cell; and
    measuring, in the measurement time set according to the status, a wireless condition of the first target frequency band to obtain a measurement result,
    wherein measuring the wireless condition of the first target frequency band comprises:
        measuring the wireless condition of the first target frequency band corresponding to the target cell according to a first measurement mode and a second measurement mode when the status is a used state, wherein the first measurement mode is a mode of measuring energy of the first target frequency band, and wherein the second measurement mode is a mode of measuring the first target frequency band according to a signal of the target cell.

2. The method of claim 1, wherein measuring the wireless condition of the first target frequency band comprises:
    measuring the wireless condition of the first target frequency band according to the first measurement mode when the status is an unused state.

3. The method of claim 2, wherein determining the status comprises:
    detecting whether a reference signal or reference information is present on the first target frequency band in the measurement time set, wherein the reference signal or the reference information carries the identification information of the target cell; and
    determining the status is the unused state when the reference signal or the reference information is not detected.

4. The method of claim 3, wherein the measurement time set comprises a first preset time resource, and wherein measuring the wireless condition of the first target frequency band comprises:
    determining, according to the first measurement mode, a measurement resource corresponding to the first measurement mode, wherein the measurement resource comprises a time resource in the first preset time resource; and
    measuring, according to the measurement resource corresponding to the first measurement mode, the wireless condition of the first target frequency band corresponding to the target cell.

5. The method of claim 4, wherein the first preset time resource comprises at least one of the following:
    a time resource that corresponds to a subframe in which a primary synchronization signal (PSS) or a secondary synchronization signal (SSS) comprised in the reference signal is located; or
    a time resource between a start time of the measurement time set and a start time of the subframe in which a primary synchronization signal (PSS) or a secondary synchronization signal SSS comprised in the reference signal is located.

6. The method of claim 1, wherein determining the status comprises:
    detecting whether a reference signal or reference information exists on the first target frequency band in the measurement time set, wherein the reference signal or the reference information carries the identification information of the target cell; and
    determining the status is the used state when the reference signal or the reference information is detected.

7. A user equipment comprising:
    a processor; and
    a memory configured to store a program which, when executed by the processor, causes the user equipment to:

determine a measurement time set and first measurement configuration information corresponding to a first target frequency band corresponding to a target cell;

configure, based on the first measurement configuration information, the user equipment to perform wireless condition measurement according to identification information of the target cell, wherein the target cell comprises a serving cell or a neighboring cell;

determine a status of using the first target frequency band by the target cell; and measure, in the measurement time set according to the status, a wireless condition of the first target frequency band according to a first measurement mode and a second measurement mode to obtain a measurement result when the status is a used state, wherein the first measurement mode is a mode of measuring energy of the first target frequency band, and wherein the second measurement mode is mode of measuring the first target frequency band according to a signal of the target cell.

8. The user equipment of claim 7, wherein the program, when executed by the processor, further causes the user equipment to:

measure the wireless condition of the first target frequency band according to the first measurement mode when the status is an unused state.

9. The user equipment of claim 8, wherein the program, when executed by the processor, further causes the user equipment to:

detect whether a reference signal or reference information is present on the first target frequency band in the measurement time set, wherein the reference signal or the reference information carries the identification information of the target cell; and determine the status is the unused state when the reference signal or the reference information is not detected.

10. The user equipment of claim 9, wherein the measurement time set comprises a first preset time resource, wherein the program, when executed by the processor, further causes the user equipment to:

determine, according to the first measurement mode, a measurement resource corresponding to the first measurement mode, wherein the measurement resource comprises a time resource in the first preset time resource, and measure, according to the measurement resource corresponding to the first measurement mode, the wireless condition of the first target frequency band corresponding to the target cell.

11. The user equipment of claim 10, wherein the first preset time resource comprises at least one of the following:

a time resource that corresponds to a subframe in which a primary synchronization signal (PSS) or a secondary synchronization signal (SSS) comprised in the reference signal is located; or a time resource between a start time of the measurement time set and a start time of the subframe in which a primary synchronization signal (PSS) or a secondary synchronization signal (SSS) comprised in the reference signal is located.

12. The user equipment of claim 7, wherein the program, when executed by the processor, further causes the user equipment to:

detect whether a reference signal or reference information is present on the first target frequency band in the measurement time set, wherein the reference signal or the reference information carries the identification information of the target cell; and determine the status is the used state when the reference signal or the reference information is detected.

13. A measurement method comprising:

determining, by a user equipment, a measurement time set and first measurement configuration information corresponding to a first target frequency band;

configuring, based on the first measurement configuration information, the user equipment to perform wireless condition measurement according to identification information of a target cell;

detecting whether a reference signal or reference information is present on the first target frequency band in the measurement time set, wherein the reference signal or the reference information carries the identification information of the target cell;

determining a status of using the first target frequency band by the target cell is the unused state when the reference signal or the reference information is not detected;

determining, according to a first measurement mode, a measurement resource corresponding to the first measurement mode, wherein the measurement resource comprises a time resource, and the time resource is in a first preset time resource;

measuring, according to the measurement resource corresponding to the first measurement mode, the wireless condition of the first target frequency band corresponding to the target cell; and measuring, in the measurement time set, the wireless condition of the first target frequency band according to the first measurement mode when the determined status of using the first target frequency band by the target cell is an unused state, wherein the first measurement mode is a mode of measuring energy of the first target frequency band, wherein the measurement time set comprises the first preset time resource.

14. The method of claim 13, wherein the first preset time resource comprises at least one of the following:

a time resource that corresponds to a subframe in which a primary synchronization signal (PSS) or a secondary synchronization signal (SSS) comprised in the reference signal is located; or a time resource between a start time of the measurement time set and a start time of the subframe in which a primary synchronization signal (PSS) or a secondary synchronization signal SSS comprised in the reference signal is located.

15. A user equipment comprising:

a processor; and a memory configured to store a program which, when executed by the processor, causes the user equipment to:

determine a measurement time set and first measurement configuration information corresponding to a first target frequency band;

configure, based on the first measurement configuration information, the user equipment to perform wireless condition measurement according to identification information of a target cell;

detect whether a reference signal or reference information is present on the first target frequency band in the measurement time set, wherein the reference signal or the reference information carries the identification information of the target cell;

determine a status of using the first target frequency band by the target cell is the unused state when the reference signal or the reference information is not detected;

determine, according to a first measurement mode, a measurement resource corresponding to the first measurement mode, wherein the measurement resource comprises a time resource, and the time resource is in a first preset time resource;

measure, according to the measurement resource corresponding to the first measurement mode, the wireless condition of the first target frequency band corresponding to the target cell; and measure, in the measurement time set, the wireless condition of the first target frequency band according to the first measurement mode when the determined status of using the first target frequency band by the target cell is an unused state, wherein the first measurement mode is a mode of measuring energy of the first target frequency band, wherein the measurement time set comprises the first preset time resource.

16. The user equipment of claim 15, wherein the first preset time resource comprises at least one of the following:

a time resource that corresponds to a subframe in which a primary synchronization signal (PSS) or a secondary synchronization signal (SSS) comprised in the reference signal is located; or a time resource between a start time of the measurement time set and a start time of the subframe in which a primary synchronization signal (PSS) or a secondary synchronization signal (SSS) comprised in the reference signal is located.

* * * * *

UNITED STATES PATENT AND TRADEMARK OFFICE
CERTIFICATE OF CORRECTION

PATENT NO. : 10,728,787 B2
APPLICATION NO. : 15/896339
DATED : July 28, 2020
INVENTOR(S) : Qiang Li, Juan Zheng and Lei Guan Page 1 of 1

It is certified that error appears in the above-identified patent and that said Letters Patent is hereby corrected as shown below:

In the Claims

Claim 1, Column 53, Line 62: "is to be perfirned" should read "is to be performed"

Signed and Sealed this
Twenty-second Day of September, 2020

Andrei Iancu
*Director of the United States Patent and Trademark Office*